(12) United States Patent
Melberg et al.

(10) Patent No.: US 12,615,137 B2
(45) Date of Patent: Apr. 28, 2026

(54) PASSWORDLESS VAULT ACCESS THROUGH SECURE VAULT ENROLLMENT

(71) Applicant: OKTA, INC., San Francisco, CA (US)

(72) Inventors: Jordan Melberg, Folsom, CA (US); Arpit Gupta, Newcastle, WA (US); Nicolas Backal Stavchansky, San Francisco, CA (US); Natan Becker Bessudo, San Francisco, CA (US); Kevin Huang, Alameda, CA (US); Vivek Raman, Orinda, CA (US)

( * ) Notice: Subject to any disclaimer, the term of this patent is extended or adjusted under 35 U.S.C. 154(b) by 41 days.

(21) Appl. No.: 18/900,144

(22) Filed: Sep. 27, 2024

(65) Prior Publication Data

US 2025/0112764 A1 Apr. 3, 2025

Related U.S. Application Data

(60) Provisional application No. 63/587,060, filed on Sep. 29, 2023.

(51) Int. Cl.
*H04L 9/08* (2006.01)
*H04L 9/14* (2006.01)

(52) U.S. Cl.
CPC .............. *H04L 9/0825* (2013.01); *H04L 9/14* (2013.01)

(58) Field of Classification Search
CPC ........ H04L 9/0825; H04L 9/14; H04L 9/3228
See application file for complete search history.

(56) References Cited

U.S. PATENT DOCUMENTS

| | | | | |
|---|---|---|---|---|
| 8,321,682 B1 * | 11/2012 | Read | ................... | H04L 63/0838 |
| | | | | 380/44 |
| 9,690,949 B1 * | 6/2017 | Diorio | ................ | G06K 7/10366 |
| 10,108,811 B1 * | 10/2018 | Walker | .................... | G06F 21/31 |
| 10,225,255 B1 * | 3/2019 | Jampani | .............. | H04L 63/1416 |
| 10,305,862 B2 | 5/2019 | Bone | | |
| 10,501,055 B1 * | 12/2019 | Yi | .......................... | G06Q 50/40 |
| 10,868,672 B1 * | 12/2020 | Farrugia | ............... | H04L 9/0861 |
| 11,025,598 B1 * | 6/2021 | Laghaeian | .......... | H04L 63/0435 |

(Continued)

OTHER PUBLICATIONS

Melberg et al., Passwordless Vault Access Through Secure Vault Enrollment, U.S. Appl. No. 63/587,060, Sep. 29, 2023, pp. 23-27, paras. [0063]-[0076], Figs. 7-8, U.S. Patent and Trademark Office.

*Primary Examiner* — Aravind K Moorthy
(74) *Attorney, Agent, or Firm* — Holland & Hart LLP

(57) ABSTRACT

Methods, systems, and devices are described. A client may perform a sign-in or registration process to register a user with an application of an identity management system. The sign-in or registration process may include receiving an indication of at least one credential associated with an identity of the user. The client may perform a vault enrollment process to configure a secure vault for the user of the application. The client may upload data to the identity management system. The data may be associated with the secure vault configured for the user of the application. The client may perform a device pairing operation to transfer a Recovery Key from the first client device to a second client device of the user. The client may use one or more keys stored in the vault to access the application of the identity management system via the second client device of the user.

20 Claims, 10 Drawing Sheets

(56) References Cited

U.S. PATENT DOCUMENTS

| | | | |
|---|---|---|---|
| 11,080,138 B1* | 8/2021 | Grube | G06F 3/0619 |
| 11,184,157 B1* | 11/2021 | Gueron | H04L 9/14 |
| 11,341,265 B1* | 5/2022 | Gunawardena | G06F 21/6245 |
| 11,811,924 B1* | 11/2023 | Spraggs | H04L 9/0662 |
| 11,895,232 B1* | 2/2024 | Stapleton | H04L 9/0861 |
| 12,003,493 B2* | 6/2024 | Bilger | H04W 12/069 |
| 12,355,873 B1* | 7/2025 | Chase | H04L 9/0825 |
| 2004/0103288 A1* | 5/2004 | Ziv | G06F 12/1466 |
| | | | 713/185 |
| 2005/0273843 A1* | 12/2005 | Shigeeda | H04L 63/0807 |
| | | | 726/5 |
| 2008/0313473 A1* | 12/2008 | Provencher | G06F 21/554 |
| | | | 713/193 |
| 2010/0043056 A1* | 2/2010 | Ganapathy | H04W 12/06 |
| | | | 726/2 |
| 2010/0211787 A1* | 8/2010 | Bukshpun | H04L 9/14 |
| | | | 380/255 |
| 2011/0113235 A1* | 5/2011 | Erickson | G06F 21/34 |
| | | | 713/192 |
| 2012/0089519 A1* | 4/2012 | Peddada | H04L 9/3297 |
| | | | 713/169 |
| 2012/0155635 A1* | 6/2012 | Vaikuntanathan | H04L 9/0894 |
| | | | 380/44 |
| 2014/0047237 A1* | 2/2014 | Parrish | H04L 9/065 |
| | | | 713/168 |
| 2014/0068261 A1* | 3/2014 | Malek | H04W 12/068 |
| | | | 713/168 |
| 2014/0281505 A1* | 9/2014 | Zhang | H04L 63/126 |
| | | | 713/158 |
| 2015/0100978 A1* | 4/2015 | Isozaki | H04N 21/835 |
| | | | 725/31 |
| 2015/0269566 A1* | 9/2015 | Gaddam | G06Q 20/385 |
| | | | 705/67 |
| 2016/0028540 A1* | 1/2016 | Ko | H04L 9/0637 |
| | | | 713/189 |
| 2016/0028698 A1* | 1/2016 | Antipa | G06F 21/606 |
| | | | 713/150 |
| 2016/0140335 A1* | 5/2016 | Proulx | H04L 9/0863 |
| | | | 726/6 |
| 2016/0261566 A1* | 9/2016 | Parviainen-Jalanko | |
| | | | H04L 63/061 |
| 2017/0012974 A1* | 1/2017 | Sierra | H04W 12/08 |
| 2017/0085543 A1* | 3/2017 | Choi | H04L 9/0841 |
| 2017/0250974 A1* | 8/2017 | Antonyraj | H04W 12/50 |
| 2017/0272433 A1* | 9/2017 | Jaggi | H04W 8/18 |
| 2017/0339559 A1* | 11/2017 | Caracas | H04W 8/18 |
| 2017/0373844 A1* | 12/2017 | Sykora | H04L 9/006 |
| 2018/0007037 A1* | 1/2018 | Reese | H04L 63/0838 |
| 2018/0063105 A1* | 3/2018 | Poon | H04L 63/123 |
| 2018/0063119 A1* | 3/2018 | Gullicksen | H04L 12/282 |
| 2018/0089029 A1* | 3/2018 | Resch | H04L 9/3247 |
| 2018/0332015 A1* | 11/2018 | Oberheide | H04L 9/0891 |
| 2019/0013945 A1* | 1/2019 | Hamlin | G06F 11/0709 |
| 2019/0020647 A1* | 1/2019 | Sinha | H04L 9/0897 |
| 2019/0052632 A1* | 2/2019 | Takagi | H04L 9/3271 |
| 2019/0087588 A1* | 3/2019 | Baboval | G06F 3/0623 |
| 2019/0132299 A1* | 5/2019 | Tucker | H04W 12/0431 |
| 2019/0205898 A1* | 7/2019 | Greco | G06Q 20/389 |
| 2019/0245686 A1* | 8/2019 | Rahimi | H04L 9/0643 |
| 2019/0312726 A1* | 10/2019 | Sierra | H04L 63/104 |
| 2019/0312731 A1* | 10/2019 | Eldefrawy | H04L 9/085 |
| 2019/0318356 A1* | 10/2019 | Martin | H04L 9/3073 |
| 2019/0325146 A1* | 10/2019 | Lei | G06F 21/602 |
| 2019/0327092 A1* | 10/2019 | Kareti | G06F 18/22 |
| 2020/0021567 A1* | 1/2020 | Salgaonkar | H04L 9/14 |
| 2020/0029208 A1* | 1/2020 | Winoto | H04W 12/06 |
| 2020/0084027 A1* | 3/2020 | Duchon | G06F 21/602 |
| 2020/0162247 A1* | 5/2020 | Nix | H04L 9/0841 |
| 2020/0193011 A1* | 6/2020 | Ruster | G06F 21/445 |
| 2020/0259636 A1* | 8/2020 | Gottipati | G06F 3/0641 |
| 2020/0267547 A1* | 8/2020 | Tal | H04L 9/08 |
| 2020/0304299 A1* | 9/2020 | Medvinsky | H04L 9/0844 |
| 2020/0313898 A1* | 10/2020 | Troia | H04L 9/088 |
| 2020/0313909 A1* | 10/2020 | Mondello | H04L 9/0869 |
| 2020/0314074 A1* | 10/2020 | Mondello | H04L 63/1466 |
| 2020/0351255 A1* | 11/2020 | Gwak | H04L 47/323 |
| 2020/0396092 A1* | 12/2020 | Cambou | H04L 9/0869 |
| 2021/0026966 A1* | 1/2021 | Ghetie | H04L 9/0662 |
| 2021/0091937 A1* | 3/2021 | Dange | H04L 9/30 |
| 2021/0144004 A1* | 5/2021 | Gray | H04L 9/0891 |
| 2021/0157939 A1* | 5/2021 | Bilger | G06F 21/45 |
| 2021/0173897 A1* | 6/2021 | Jakobsson | G06F 21/44 |
| 2021/0266309 A1* | 8/2021 | Guccione | H04L 63/0815 |
| 2021/0328976 A1* | 10/2021 | Leavy | H04L 9/14 |
| 2021/0365547 A1* | 11/2021 | Atkinson | H04L 9/0894 |
| 2021/0377049 A1* | 12/2021 | Nix | H04L 9/0877 |
| 2022/0004661 A1* | 1/2022 | Dange | H04L 63/061 |
| 2022/0029794 A1* | 1/2022 | Malhotra | H04L 9/3242 |
| 2022/0052843 A1* | 2/2022 | Carver | H04L 9/3073 |
| 2022/0109666 A1* | 4/2022 | Collier | H04L 63/083 |
| 2022/0187989 A1* | 6/2022 | Resch | G06F 3/0629 |
| 2022/0209944 A1* | 6/2022 | Nix | H04L 9/0825 |
| 2022/0209965 A1* | 6/2022 | Montgomery | H04L 9/0825 |
| 2022/0350615 A1* | 11/2022 | Grobelny | H04L 9/3226 |
| 2022/0360448 A1* | 11/2022 | Sahni | H04L 63/0846 |
| 2023/0006994 A1* | 1/2023 | Krishna | H04L 63/0838 |
| 2023/0060803 A1* | 3/2023 | Moon | H04L 9/3228 |
| 2023/0198785 A1* | 6/2023 | Henning | G06Q 20/36 |
| | | | 380/28 |
| 2023/0214464 A1* | 7/2023 | Dange | G06F 21/32 |
| | | | 726/19 |
| 2023/0224150 A1* | 7/2023 | Serguieva | H04L 9/3231 |
| | | | 713/155 |
| 2023/0237146 A1* | 7/2023 | Balakrishnan | H04L 9/321 |
| | | | 726/6 |
| 2023/0308424 A1* | 9/2023 | Nix | H04L 9/3242 |
| 2023/0325526 A1* | 10/2023 | Resch | G06F 3/0619 |
| 2023/0328050 A1* | 10/2023 | Grover | H04L 63/08 |
| | | | 713/168 |
| 2024/0022565 A1* | 1/2024 | Keith, Jr. | H04L 63/0861 |
| 2024/0267224 A1* | 8/2024 | Chen | H04L 9/0863 |
| 2024/0273243 A1* | 8/2024 | Lindskog | G06F 21/62 |
| 2025/0077256 A1* | 3/2025 | Farley | G06F 9/45558 |
| 2025/0112928 A1* | 4/2025 | Tahaliyani | H04L 9/088 |

* cited by examiner

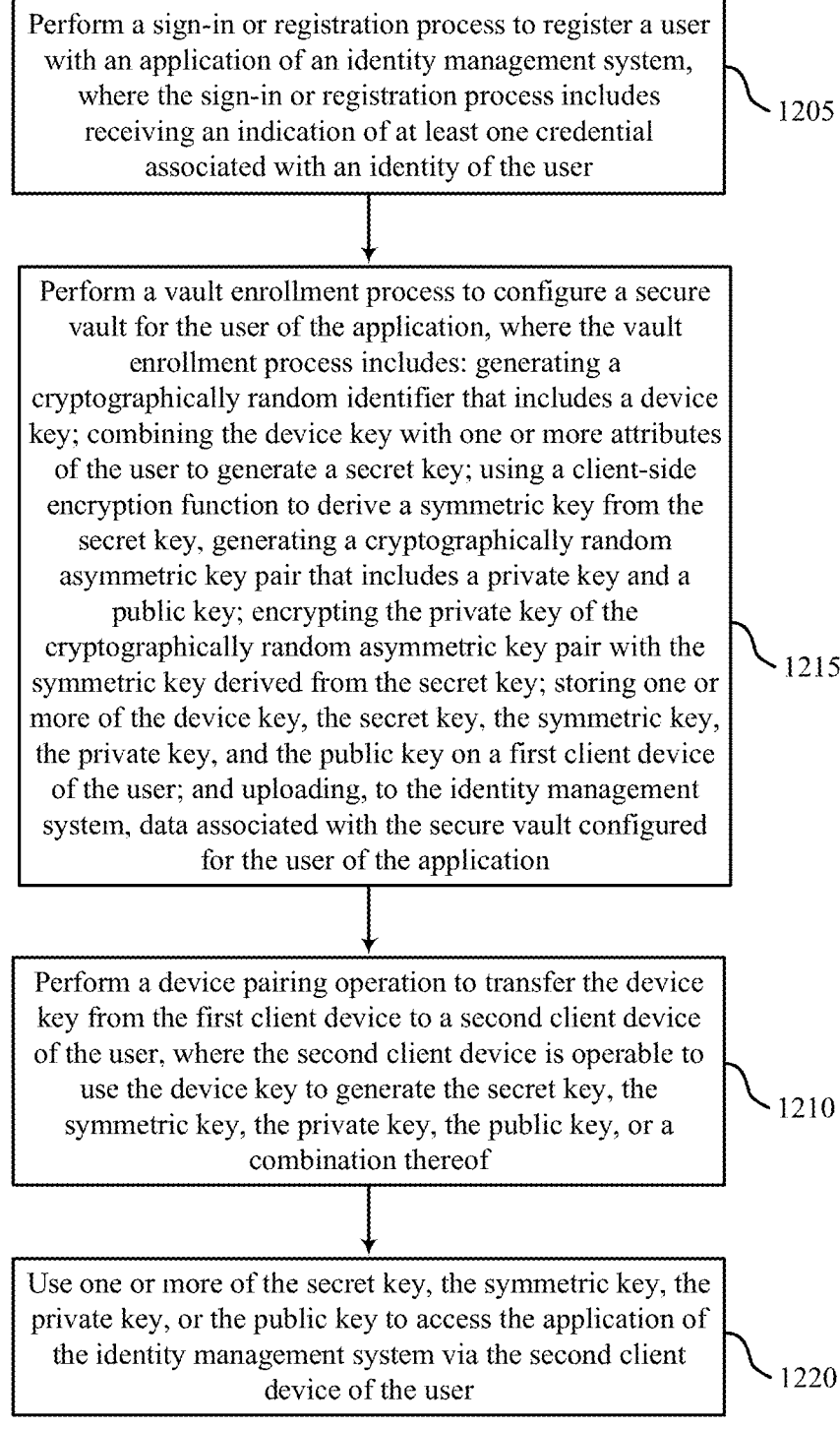

Perform a sign-in or registration process to register a user with an application of an identity management system, where the sign-in or registration process includes receiving an indication of at least one credential associated with an identity of the user ⌐ 1205

Perform a vault enrollment process to configure a secure vault for the user of the application, where the vault enrollment process includes: generating a cryptographically random identifier that includes a device key; combining the device key with one or more attributes of the user to generate a secret key; using a client-side encryption function to derive a symmetric key from the secret key, generating a cryptographically random asymmetric key pair that includes a private key and a public key; encrypting the private key of the cryptographically random asymmetric key pair with the symmetric key derived from the secret key; storing one or more of the device key, the secret key, the symmetric key, the private key, and the public key on a first client device of the user; and uploading, to the identity management system, data associated with the secure vault configured for the user of the application ⌐ 1215

Perform a device pairing operation to transfer the device key from the first client device to a second client device of the user, where the second client device is operable to use the device key to generate the secret key, the symmetric key, the private key, the public key, or a combination thereof ⌐ 1210

Use one or more of the secret key, the symmetric key, the private key, or the public key to access the application of the identity management system via the second client device of the user ⌐ 1220

PASSWORDLESS VAULT ACCESS THROUGH SECURE VAULT ENROLLMENT

CROSS REFERENCE

The present Application for Patent claims the benefit of U.S. Provisional Patent Application No. 63/587,060 by Melberg et al., entitled "PASSWORDLESS VAULT ACCESS THROUGH SECURE VAULT ENROLLMENT," filed Sep. 29, 2023, which is assigned to the assignee hereof, and which is expressly incorporated by reference herein.

FIELD OF TECHNOLOGY

The present disclosure relates generally to identity management, and more specifically to passwordless vault access through secure vault enrollment.

BACKGROUND

An identity management system may be employed to manage and store various forms of user data, including usernames, passwords, email addresses, permissions, roles, group memberships, etc. The identity management system may provide authentication services for applications, devices, users, and the like. The identity management system may enable organizations to manage and control access to resources, for example, by serving as a central repository that integrates with various identity sources. The identity management system may provide an interface that enables users to access a multitude of applications with a single set of credentials.

SUMMARY

A method is described. The method may include: performing a sign-in or registration process to register a user with an application of an identity management system, where the sign-in or registration process includes receiving an indication of at least one credential associated with an identity of the user; performing a vault enrollment process to configure a secure vault for the user of the application, where the vault enrollment process includes: generating a cryptographically random identifier; combining the cryptographic random identifier with one or more attributes of the user to generate a Recovery Key (e.g., a secret key); using a client-side encryption function to derive a symmetric key from the Recovery Key; generating a cryptographically random asymmetric keypair that includes a private key and a public key; encrypting the private key of the cryptographically random asymmetric keypair with the symmetric key derived from the Recovery Key; storing one or more of the Recovery Key (e.g., a device key, a vault key, a secret key, or any combination thereof), the symmetric key, the private key, and the public key on a first client device of the user; and uploading, to the identity management system, data associated with the secure vault configured for the user of the application; performing a device pairing operation to transfer the Recovery Key from the first client device to a second client device of the user, where the second client device is operable to use the Recovery Key to generate the symmetric key, the private key, the public key, or a combination thereof; and using one or more of the Recovery Key, the symmetric key, the private key, or the public key to access the application of the identity management system via the second client device of the user.

An apparatus is described. The apparatus may include: one or more memories storing processor-executable code; and one or more processors coupled with the one or more memories. The one or more processors may be individually or collectively operable to execute the code to cause the apparatus to: perform a sign-in or registration process to register a user with an application of an identity management system, where the sign-in or registration process includes receiving an indication of at least one credential associated with an identity of the user; perform a vault enrollment process to configure a secure vault for the user of the application, where the vault enrollment process includes: generating a cryptographically random identifier; combining the cryptographically random identifier with one or more attributes of the user to generate a Recovery Key; using a client-side encryption function to derive a symmetric key from the Recovery Key; generating a cryptographically random asymmetric keypair that includes a private key and a public key; encrypting the private key of the cryptographically random asymmetric keypair with the symmetric key derived from the Recovery Key; storing one or more of the Recovery Key, the symmetric key, the private key, and the public key on a first client device of the user; and uploading, to the identity management system, data associated with the secure vault configured for the user of the application; perform a device pairing operation to transfer the Recovery Key from the first client device to a second client device of the user, where the second client device is operable to use the Recovery Key to generate the symmetric key, the private key, the public key, or a combination thereof; and use one or more of the Recovery Key, the symmetric key, the private key, or the public key to access the application of the identity management system via the second client device of the user.

A non-transitory computer-readable medium storing code is described. The code may include instructions executable by at least one processor to: perform a sign-in or registration process to register a user with an application of an identity management system, where the sign-in or registration process includes receiving an indication of at least one credential associated with an identity of the user; perform a vault enrollment process to configure a secure vault for the user of the application, where the vault enrollment process includes: generating a cryptographically random identifier; combining the cryptographically random identifier with one or more attributes of the user to generate a Recovery Key; using a client-side encryption function to derive a symmetric key from the Recovery Key; generating a cryptographically random asymmetric keypair that includes a private key and a public key; encrypting the private key of the cryptographically random asymmetric keypair with the symmetric key derived from the Recovery Key; storing one or more of the Recovery Key, the symmetric key, the private key, and the public key on a first client device of the user; and uploading, to the identity management system, data associated with the secure vault configured for the user of the application; perform a device pairing operation to transfer the Recovery Key from the first client device to a second client device of the user, where the second client device is operable to use the symmetric key, the private key, the public key, or a combination thereof; and use one or more of the symmetric key, the private key, or the public key to access the application of the identity management system via the second client device of the user.

In some examples described herein, the sign-in or registration process may include operations, features, means, or instructions for receiving, via the first client device or the second client device, a user input including the at least one credential of the user and a one-time password (OTP) provided by the identity management system.

In some examples described herein, the OTP includes a 6-digit email verification code. In some examples described herein, the first client device includes a mobile client, and the second client device includes a web client. In some examples described herein, the first client device includes a web client, and the second client device includes a mobile client.

Some examples described herein may further include installing the application or a plug-in (e.g., a browser extension) associated with the application on the first client device or the second client device, where at least one step of the vault enrollment process is performed using the application or the browser extension.

In some examples described herein, the Recovery Key may be transferred from the first client device to the second client device via a user input (e.g., a quick response (QR) code), or a secure communication link between the first client device and the second client device.

BRIEF DESCRIPTION OF THE DRAWINGS

FIG. 10 shows a flowchart illustrating a method that supports passwordless vault access through secure vault enrollment in accordance with aspects of the present disclosure.

DETAILED DESCRIPTION

Figure 1:
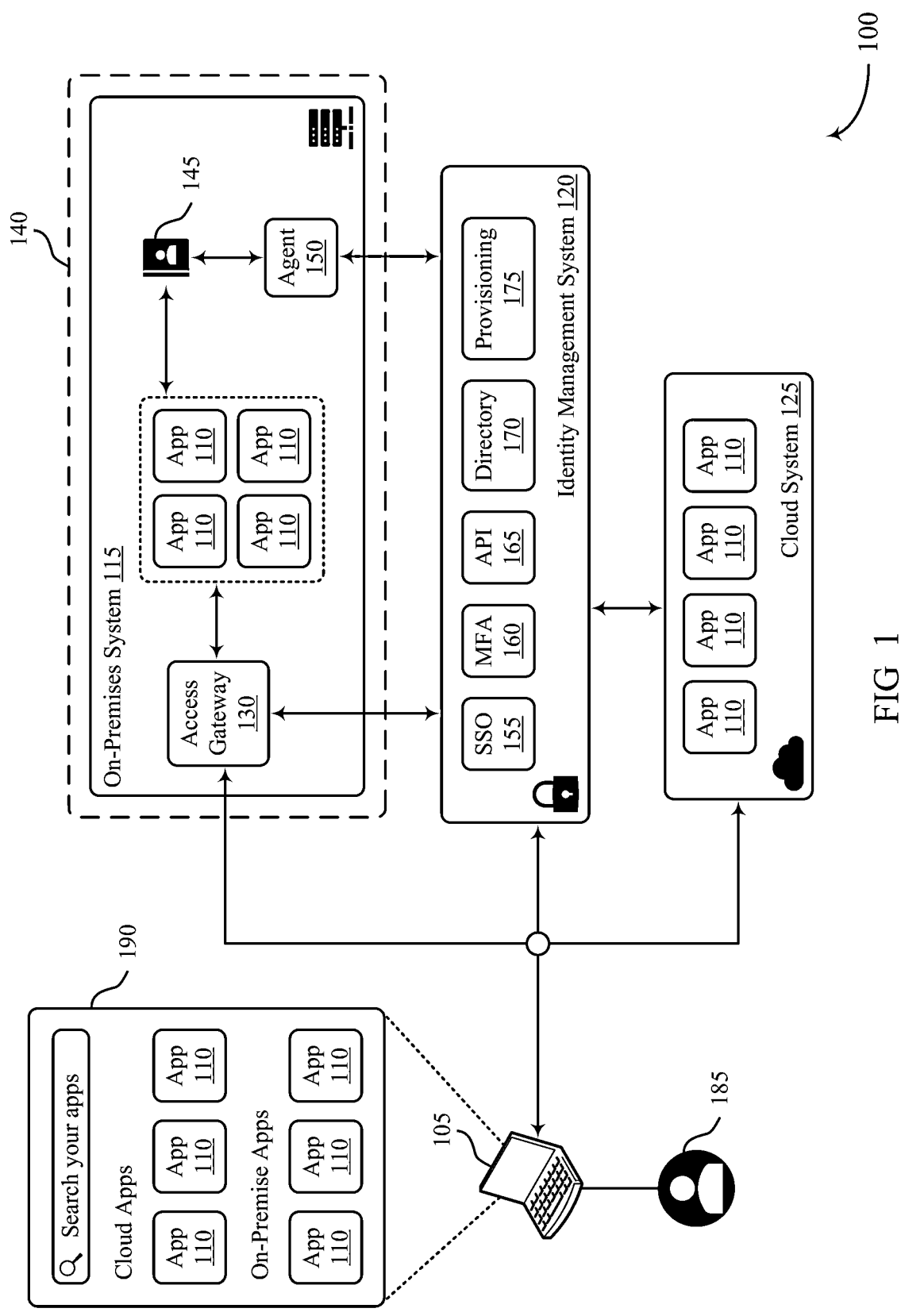
FIG. 1 illustrates an example of a computing system that supports passwordless vault access through secure vault enrollment in accordance with aspects of the present disclosure.

In some computing systems, a software application may request a user to log into an account using authentication information, such as a combination of a username and a password. Users who have accounts for several different applications must therefore remember several different usernames and passwords. Additionally, or alternatively, the necessity of separately logging in to each application may impose a considerable burden on a user, who must enter usernames and passwords for each application used. In some cases, a user may employ a service of an identity management system to help manage passwords or other identifying information of the user that may be use for accessing the user's accounts with various software applications. Such a service may be referred to herein as a vault or a credential manager (e.g., a digital wallet). The identity management system may necessitate that a user perform a multi-step unlock sequence to access the user's vault. In some cases, however, the multi-step sequence may rely on multiple knowledge factors, such as a password and a personal identification number (PIN). In some examples, however, a quantity of digits included in the PIN (e.g., six digits) may constrain a quantity of users of an identity management system that may be supported by a respective PIN. For example, a six-digit PIN may not provide sufficient PIN diversity for the identity management system to support an increasing quantity of users (e.g., without introducing security vulnerabilities to the identity management system). Additionally, necessitating that users remember two relatively complex knowledge factors may lead to an increase in forgotten-password requests, which may lead to a degraded user experience.

Various aspects of the present disclosure generally relate to passwordless vault access through secure vault enrollment and, more specifically, to a framework for enabling user access to secure data without knowledge factors. For example, a user may use an identity management system to manage the user's access to an account the user has with an application. To enable the identity management system to store various identifying information of the user, such that the user may access the account, the user may determine to perform a vault enrollment process. In accordance with the vault enrollment process, the user may submit a single credential to the identity management system via a user interface on a first client device of the user. The user interface may be part of a client (e.g., software application running on or accessed via the first client device) associated with the identity management system, such as web client or a mobile client. The credential may be of relatively low complexity and may be relatively easy for the user to remember, such as an email address. The client may then randomly generate a secret key (e.g., a Recovery Key) that may be stored on the client device.

For example, to configure a secure vault for the user (e.g., to enroll the user for access to a secure vault), the client may first generate a cryptographically random identifier that includes a device key. The client may then generate the secret key by combining the device key with one or more attributes of the user (e.g., some identifying information of the user that is accessible by the client on the client device). The client may use a client-side encryption function (e.g., an encryption function of the client) to derive a symmetric key from the secret key. The client may generate an asymmetric keypair (e.g., a cryptographically random asymmetric keypair) that includes a private key and a public key. The client may then encrypt the private key of the cryptographically random asymmetric keypair with the symmetric key derived from the secret key. The client may store at least one of the multiple keys on the client device of the user (e.g., a mobile device, a laptop). The stored key may be referred to herein as a Recovery Key and may be used as a backup for account access. The client may then upload data to the identity management system (e.g., to one or more servers of the identity management system). The data may be associated with the secure vault configured (e.g., enrolled) for the user.

In some examples, the user may wish to access the vault from multiple devices. For example, the user may wish to access the vault for access to the application on a second client device of the user. As such, the identity management system may enable secure sharing of one or more of the stored keys between the first and second client devices of the user. For example, the client may perform a device pairing operation to transfer the Recovery Key from the first client device to the second client device of the user. The second client device may include the client (or another client associated with the identity management system) and may use the Recovery Key (e.g., a device key) to generate a vault key, a security key, the symmetric key, the private key, the public key, or a combination thereof. The user may then access the application on the client device using one of the symmetric key, the private key, the public key, or some combination thereof. Aspects of the disclosure are initially described in the context of a computing system and flow-charts. Aspects of the disclosure are further illustrated by and described with reference to apparatus diagrams, system diagrams, and flowcharts that relate to passwordless vault access through secure vault enrollment.

FIG. 1 illustrates an example of a computing system 100 that supports passwordless vault access through secure vault enrollment in accordance with various aspects of the present disclosure. The computing system 100 includes a computing device 105 (such as a desktop, laptop, smartphone, tablet, or the like), an on-premises system 115, an identity manage-ment system 120, and a cloud system 125, which may communicate with each other via a network, such as a wired network (e.g., the Internet), a wireless network (e.g., a cellular network, a wireless local area network (WLAN)), or both. In some cases, the network may be implemented as a public network, a private network, a secured network, an unsecured network, or any combination thereof. The net-work may include various communication links, hubs, bridges, routers, switches, ports, or other physical and/or logical network components, which may be distributed across the computing system 100.

The on-premises system 115 (also referred to as an on-premises infrastructure or environment) may be an example of a computing system in which a client organiza-tion owns, operates, and maintains its own physical hard-ware and/or software resources within its own data center(s) and facilities, instead of using cloud-based (e.g., off-site) resources. Thus, in the on-premises system 115, hardware, servers, networking equipment, and other infrastructure components may be physically located within the "prem-ises" of the client organization, which may be protected by a firewall 140 (e.g., a network security device or software application that is configured to monitor, filter, and control incoming/outgoing network traffic). In some examples, users may remotely access or otherwise utilize compute resources of the on-premises system 115, for example, via a virtual private network (VPN).

In contrast, the cloud system 125 (also referred to as a cloud-based infrastructure or environment) may be an example of a system of compute resources (such as servers, databases, virtual machines, containers, and the like) that are hosted and managed by a third-party cloud service provider using third-party data center(s), which can be physically co-located or distributed across multiple geographic regions. The cloud system 125 may offer high scalability and a wide range of managed services, including (but not limited to) database management, analytics, machine learning (ML), artificial intelligence (AI), etc. Examples of cloud systems 125 include (AMAZON WEB SERVICES) AWS®, MICROSOFT AZURE®, GOOGLE CLOUD PLAT-FORM®, ALIBABA CLOUD®, ORACLE® CLOUD INFRASTRUCTURE (OCI), and the like.

The identity management system 120 may support one or more services, such as a single sign-on (SSO) service 155, a multi-factor authentication (MFA) service 160, an appli-cation programming interface (API) service 165, a directory management service 170, or a provisioning service 175 for various on-premises applications 110 (e.g., applications 110 running on compute resources of the on-premises system

115) and/or cloud applications 110 (e.g., applications 110 running on compute resources of the cloud system 125), among other examples of services. The SSO service 155, the MFA service 160, the API service 165, the directory man-agement service 170, and/or the provisioning service 175 may be individually or collectively provided (e.g., hosted) by one or more physical machines, virtual machines, physi-cal servers, virtual (e.g., cloud) servers, data centers, or other compute resources managed by or otherwise accessible to the identity management system 120.

A user 185 may interact with the computing device 105 to communicate with one or more of the on-premises system 115, the identity management system 120, or the cloud system 125. For example, the user 185 may access one or more applications 110 by interacting with an interface 190 of the computing device 105. In some implementations, the user 185 may be prompted to provide some form of iden-tification (such as a password, personal identification num-ber (PIN), biometric information, or the like) before the interface 190 is presented to the user 185. In some imple-mentations, the user 185 may be a developer, customer, employee, vendor, partner, or contractor of a client organi-zation (such as a group, business, enterprise, non-profit, or startup that uses one or more services of the identity man-agement system 120). The applications 110 may include one or more on-premises applications 110 (hosted by the on-premises system 115), mobile applications 110 (configured for mobile devices), and/or one or more cloud applications 110 (hosted by the cloud system 125).

The SSO service 155 of the identity management system 120 may allow the user 185 to access multiple applications 110 with one or more credentials. Once authenticated, the user 185 may access one or more of the applications 110 (for example, via the interface 190 of the computing device 105). That is, based on the identity management system 120 authenticating the identity of the user 185, the user 185 may obtain access to multiple applications 110, for example, without having to re-enter the credentials (or enter other credentials). The SSO service 155 may leverage one or more authentication protocols, such as Security Assertion Markup Language (SAML) or OpenID Connect (OIDC), among other examples of authentication protocols. In some examples, the user 185 may attempt to access an application 110 via a browser. In such examples, the browser may be redirected to the SSO service 155 of the identity manage-ment system 120, which may serve as the identity provider (IdP). For example, in some implementations, the browser (e.g., the user's request communicated via the browser) may be redirected by an access gateway 130 (e.g., a reverse proxy-based virtual application configured to secure web applications 110 that may not natively support SAML or OIDC).

In some examples, the access gateway 130 may support integrations with legacy applications 110 using hypertext transfer protocol (HTTP) headers and Kerberos tokens, which may offer universal resource locator (URL)-based authorization, among other functionalities. In some examples, such as in response to the user's request, the IdP may prompt the user 185 for one or more credentials (such as a password, PIN, biometric information, or the like) and the user 185 may provide the requested authentication credentials to the IdP. In some implementations, the IdP may leverage the MFA service 160 for added security. The IdP may verify the user's identity by comparing the credentials provided by the user 185 to credentials associated with the user's account. For example, one or more credentials asso-ciated with the user's account may be registered with the IdP (e.g., previously registered, or otherwise authorized for authentication of the user's identity via the IdP). The IdP may generate a security token (such as a SAML token or OAth 2.0 token) containing information associated with the identity and/or authentication status of the user 185 based on successful authentication of the user's identity.

The IdP may send the security token to the computing device 105 (e.g., the browser or application 110 running on the computing device 105). In some examples, the application 110 may be associated with a service provider (SP), which may host or manage the application 110. In such examples, the computing device 105 may forward the token to the SP. Accordingly, the SP may verify the authenticity of the token and determine whether the user 185 is authorized to access the requested applications 110. In some examples, such as examples in which the SP determines that the user 185 is authorized to access the requested application, the SP may grant the user 185 access to the requested applications 110, for example, without prompting the user 185 to enter credentials (e.g., without prompting the user to log-in). The SSO service 155 may promote improved user experience (e.g., by limiting the number of credentials the user 185 has to remember/enter), enhanced security (e.g., by leveraging secure authentication protocols and centralized security policies), and reduced credential fatigue, among other benefits.

The MFA service 160 of the identity management system 120 may enhance the security of the computing system 100 by prompting the user 185 to provide multiple authentication factors before granting the user 185 access to applications 110. These authentication factors may include one or more knowledge factors (e.g., something the user 185 knows, such as a password), one or more possession factors (e.g., something the user 185 is in possession of, such as a mobile app-generated code or a hardware token), or one or more inherence factors (e.g., something inherent to the user 185, such as a fingerprint or other biometric information). In some implementations, the MFA service 160 may be used in conjunction with the SSO service 155. For example, the user 185 may provide the requested login credentials to the identity management system 120 in accordance with an SSO flow and, in response, the identity management system 120 may prompt the user 185 to provide a second factor, such as a possession factor (e.g., a onetime passcode (OTP), a hardware token, a text message code, an email link/code). The user 185 may obtain access (e.g., be granted access by the identity management system 120) to the requested applications 110 based on successful verification of both the first authentication factor and the second authentication factor.

The API service 165 of the identity management system 120 can secure APIs by managing access tokens and API keys for various client organizations, which may enable (e.g., only enable) authorized applications (e.g., one or more of the applications 110) and authorized users (e.g., the user 185) to interact with a client organization's APIs. The API service 165 may enable client organizations to implement customizable login experiences that are consistent with their architecture, brand, and security configuration. The API service 165 may enable administrators to control user API access (e.g., whether the user 185 and/or one or more other users have access to one or more particular APIs). In some examples, the API service 165 may enable administrators to control API access for users via authorization policies, such as standards-based authorization policies that leverage OAuth 2.0. The API service 165 may additionally, or alternatively, implement role-based access control (RBAC) for applications 110. In some implementations, the API service 165 can be used to configure user lifecycle policies that automate API onboarding and off-boarding processes.

The directory management service 170 may enable the identity management system 120 to integrate with various identity sources of client organizations. In some implementations, the directory management service 170 may communicate with a directory service 145 of the on-premises system 115 via a software agent 150 installed on one or more computers, servers, and/or devices of the on-premises system 115. Additionally, or alternatively, the directory management service 170 may communicate with one or more other directory services, such as one or more cloud-based directory services. As described herein, a software agent 150 generally refers to a software program or component that operates on a system or device (such as a device of the on-premises system 115) to perform operations or collect data on behalf of another software application or system (such as the identity management system 120).

The provisioning service 175 of the identity management system 120 may support user provisioning and deprovisioning. For example, in response to an employee joining a client organization, the identity management system 120 may automatically create accounts for the employee and provide the employee with access to one or more resources via the accounts. Similarly, in response to the employee (or some other employee) leaving the client organization, the identity management system 120 may autonomously deprovision the employee's accounts and revoke the employee's access to the one or more resources (e.g., with little to no intervention from the client organization). The provisioning service 175 may maintain audit logs and records of user deprovisioning events, which may help the client organization demonstrate compliance and track user lifecycle changes. In some implementations, the provisioning service 175 may enable administrators to map user attributes and roles (e.g., permissions, privileges) between the identity management system 120 and connected applications 110, ensuring that user profiles are consistent across the identity management system 120, the on-premises system 115, and the cloud system 125.

Although not depicted in the example of FIG. 1, a person skilled in the art would appreciate that the identity management system 120 may support or otherwise provide access to any number of additional or alternative services, applications 110, platforms, providers, or the like. In other words, the functionality of the identity management system 120 is not limited to the exemplary components and services mentioned in the preceding description of the computing system 100. The description herein is provided to enable a person skilled in the art to make or use the present disclosure. Various modifications to the present disclosure will be readily apparent to those skilled in the art, and the generic principles defined herein may be applied to other variations without departing from the scope of the present disclosure. Accordingly, the present disclosure is not limited to the examples and designs described herein, but is to be accorded the broadest scope consistent with the principles and novel features disclosed herein.

Figure 2:
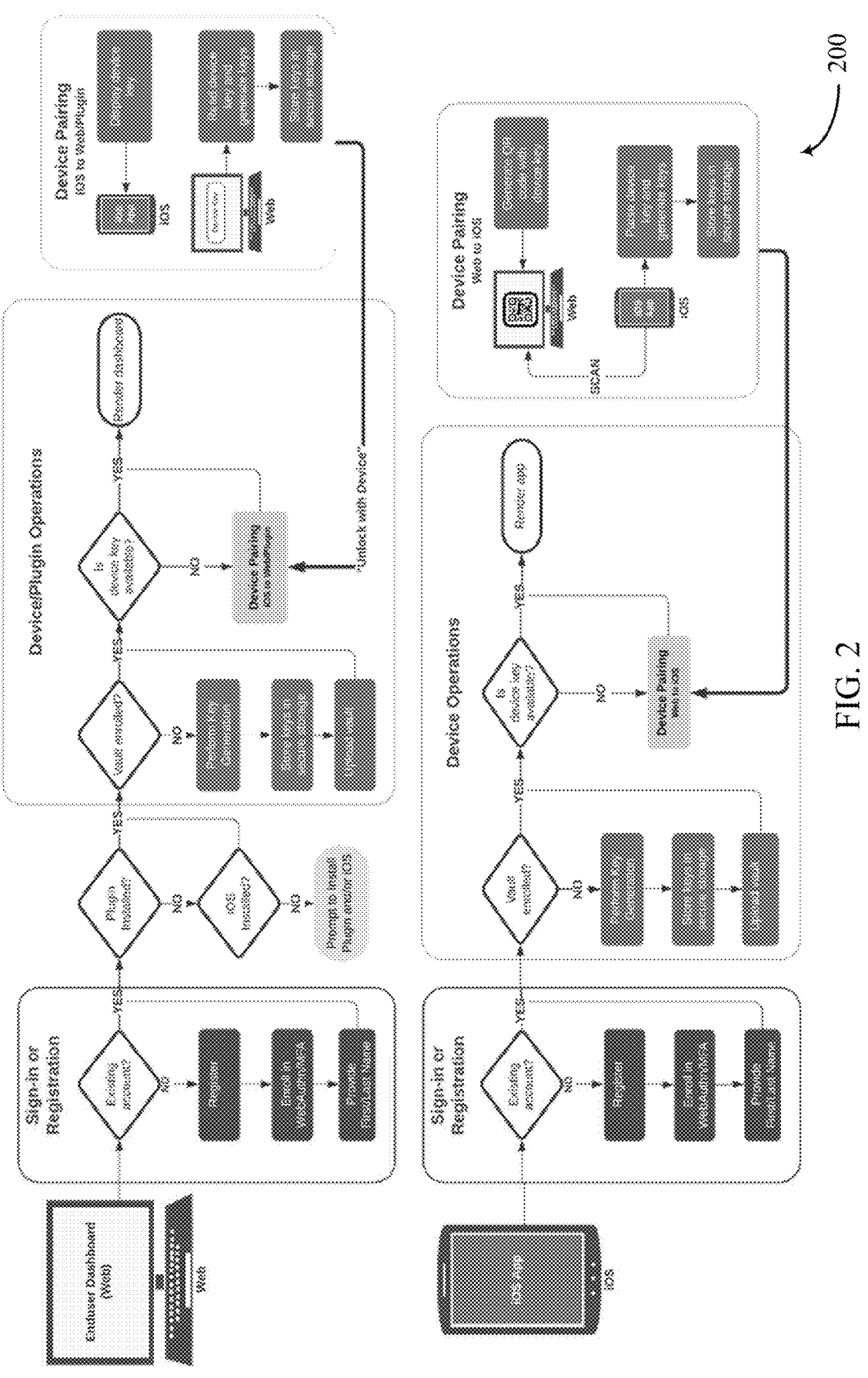
FIGS. 2 through 6 show examples of flowcharts that support passwordless vault access through secure vault enrollment in accordance with aspects of the present disclosure.

FIG. 2 shows an example of a flowchart 200 that supports passwordless vault access through secure vault enrollment in accordance with aspects of the present disclosure. The flowchart 200 may implement one or more aspects of the computing system 100, as shown and described with reference to FIG. 1. For example, one or more operations of the flowchart 200 may be implemented (at least in part) by the identity management system 120, a first client device 105 (such as a web client or a mobile client), and a second client device 105 (such as a mobile client or a web client), which may be examples of corresponding devices and systems described herein, including with reference to FIG. 1. The flowchart 200 depicted in the example of FIG. 2 shows an example of a passwordless vault access scheme, whereby a user of the identity management system 120 can securely access an application 110 of the identity management system 120 without providing a password.

The described techniques enable consumers to securely access their apps, credentials, and other secure data without the need to provide a knowledge factor. The identity management system 120 utilizes a multi-step "unlock" sequence that relies on two knowledge factors: a password created by the user at registration, used to establish an authenticated session with an IdP (such as the identity management system 120); a cryptographically random string made up of a quantity of alphanumeric characters (e.g., a range of 16 to 24 alphanumeric characters), used as input for creating a symmetric key. This symmetric key is used to encrypt/decrypt keys used to encrypt/decrypt credentials and is never shared with the identity management system 120. The techniques described herein support techniques for avoiding knowledge factors altogether.

With client-side encryption, a second knowledge factor may be introduced to user registration and authentication flows. A 6-digit personal identification number (PIN) may not have sufficient entropy, making it difficult to scale beyond a threshold number of registered users without a risk to product health. The password and PIN may not be coupled together if the identity management system 120 does not implement a secure remote password (SRP) to avoid revealing secrets to the IdP. Having users memorize two complex knowledge factors may cause churn and increase forgotten-password requests. Other organizations may leverage phishing resistant solutions like passkeys and device authenticators to authenticate users.

Users 185 may have at most one knowledge factor for both authentication and encryption. Servers of the identity management system 120 may refrain from putting any sensitive user data at risk, even with significant computing power. Users 185 can regain access to their account/vault with or without the assistance of another user 185 or individual. The techniques described herein generally provide for passwordless authentication and passwordless vault access.

In some implementations, the identity management system 120 may support passwordless authentication through Fast Identity Online (FIDO2). Some identity verification techniques involve knowledge-based credentials that are stored on a server. Such credentials may include short message service (SMS) one-time passwords (OTP) and passwords. Possession-based credentials, on the other hand, are kept on-device. These credentials may include local biometric and multi-device FIDO credentials. Delegating authentication to an IdP like the identity management system 120 may provide several technical advantages. For example, an application 110 can simply configure authentication to be passwordless for its users based on one of the following methods: email or SMS; clicking on a link from the user's email client; providing a one-time password sent to their email address; providing a one-time password sent via SMS; and device biometrics The techniques described herein may utilize device biometrics (where supported) to quickly and securely login. Additionally, or alternatively, the described techniques may leverage "progressive enrollment", granting users the ability to provide their password as a fallback.

The identity management system 120 may provide the following additional method as passwordless techniques: a method that utilizes the authenticator application on a desktop or mobile app and biometrics to quickly and securely login, and phishing-resistant, for example, when the identity management system 120 adopts a passwordless authentication solution relatively quickly, as an associated identity provider lets us configure this within their login mechanism.

Figure 3:
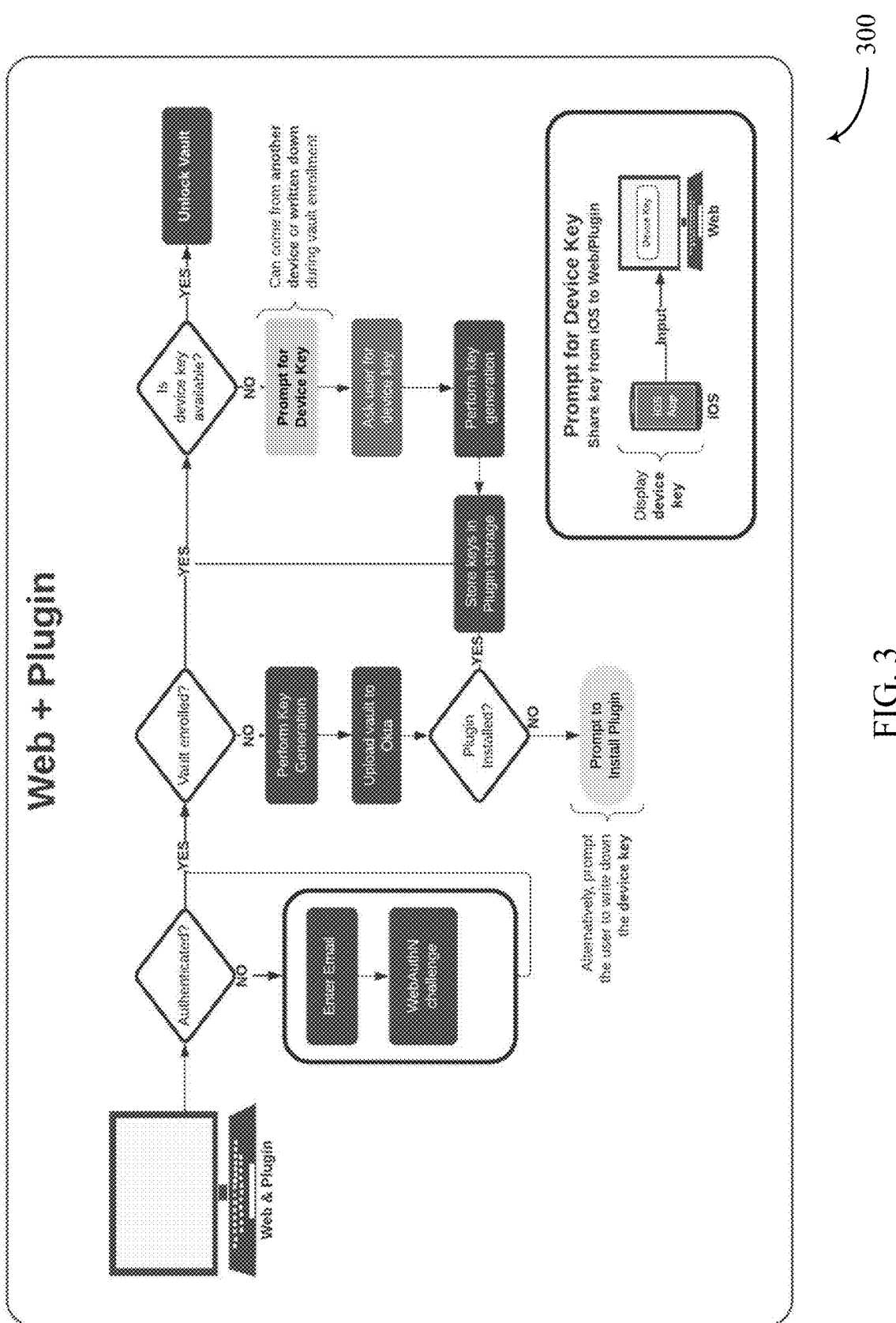

FIG. 3 shows an example of a flowchart 300 that supports passwordless vault access through secure vault enrollment in accordance with aspects of the present disclosure. The flowchart 300 may implement one or more aspects of the computing system 100, as shown and described with reference to FIG. 1. For example, one or more operations of the flowchart 300 may be implemented (at least in part) by the identity management system 120, a first client device 105 (such as a web client or a mobile client), and a second client device 105 (such as a mobile client or a web client), which may be examples of corresponding devices and systems described herein, including with reference to FIG. 1. The flowchart 300 depicted in the example of FIG. 3 shows an example of a passwordless vault access scheme that enables a user 185 of the identity management system 120 to securely access an application 110 of the identity management system 120 without providing a password.

The passwordless vault access schemes described herein may utilize web authentication and pseudo-random function extension(s). As an authentication extension (e.g., to WebAuthn) the pseudo-random function extension may grant developers the ability to derive cryptographically random 32-byte Array Buffers, which can represent symmetric key material. Contained within a browser context, clients may be able to easily derive deterministic symmetric keypairs.

During registration, a browser client may request pseudo-random function (PRF) support when an authenticator (device, browser, etc.) explicitly requests it. After a successful authentication request, the browser can retrieve access to the PRF key and generate a cryptographic key in raw format.

Once a symmetric key is generated, it can be used as a derived wrapper key, encrypting the vault encryption/decryption keys. This allows web clients access to derive shared keys, and builds off of a well-known protocol by utilizing a possession-factor to derive symmetric keys. Device-assisted mechanisms can be used to avoid passwords. Device-assisted mechanisms can be used to avoid passwords. Some password managers rely on leveraging the user's smartphone "as a password". The device acts as a hardware security module (HSM), which provides the relying party with a key to decrypt sensitive data.

Device-assisted account access may be used instead of the knowledge factor (password) with a possession factor, something the user "has". As long as this secondary device is accessible, data can be decrypted securely. Examples of device-assisted schemes include: establishing a secure connection between two devices, where secrets can be shared within an end-to-end encrypted channel; swipe-to-login, using push notifications to initiate a Diffie-Hellman key exchange; login with device, using push notifications and a fingerprint passphrase to initiate a Diffie-Hellman key exchange; Bluetooth Diffie-Hellman key exchange over Bluetooth. One or more of the above-mentioned processes may be enabled during onboarding.

For example, a user is often subject to an extensive setup that accomplishes the following: establish a long-lived session on the primary device (e.g. home computer); download a mobile application; generate and store a public/private keypair on the device; and link devices to the mobile application. A relationship between devices can be managed in a variety of ways, and a client of the identity management system 120 can take an iterative approach to implement a zero-trust model between two devices/agents.

With the techniques described herein, there may be a relatively low likelihood of breaking key encryption, as keys are stored and randomly generated on an HSM. The user experience may be similar to the technology of passkeys. The described techniques can be performed offline, and may be phishing and social-engineering proof. Passkeys may improve upon FIDO authenticators and existing password-less solutions. Passkeys may help reduce the prevalence of passwords throughout the industry. Implemented with both user experience and security in mind, passkeys provide an easy recovery solution, as credentials are backed up to first and third party cloud providers. Aspects of the present disclosure support multiple enrollments per device, and may offer a phishing-resistant authentication method. The identity management system 120 may offer built-in support for all major operating systems, and relatively easy recovery.

Figure 4:
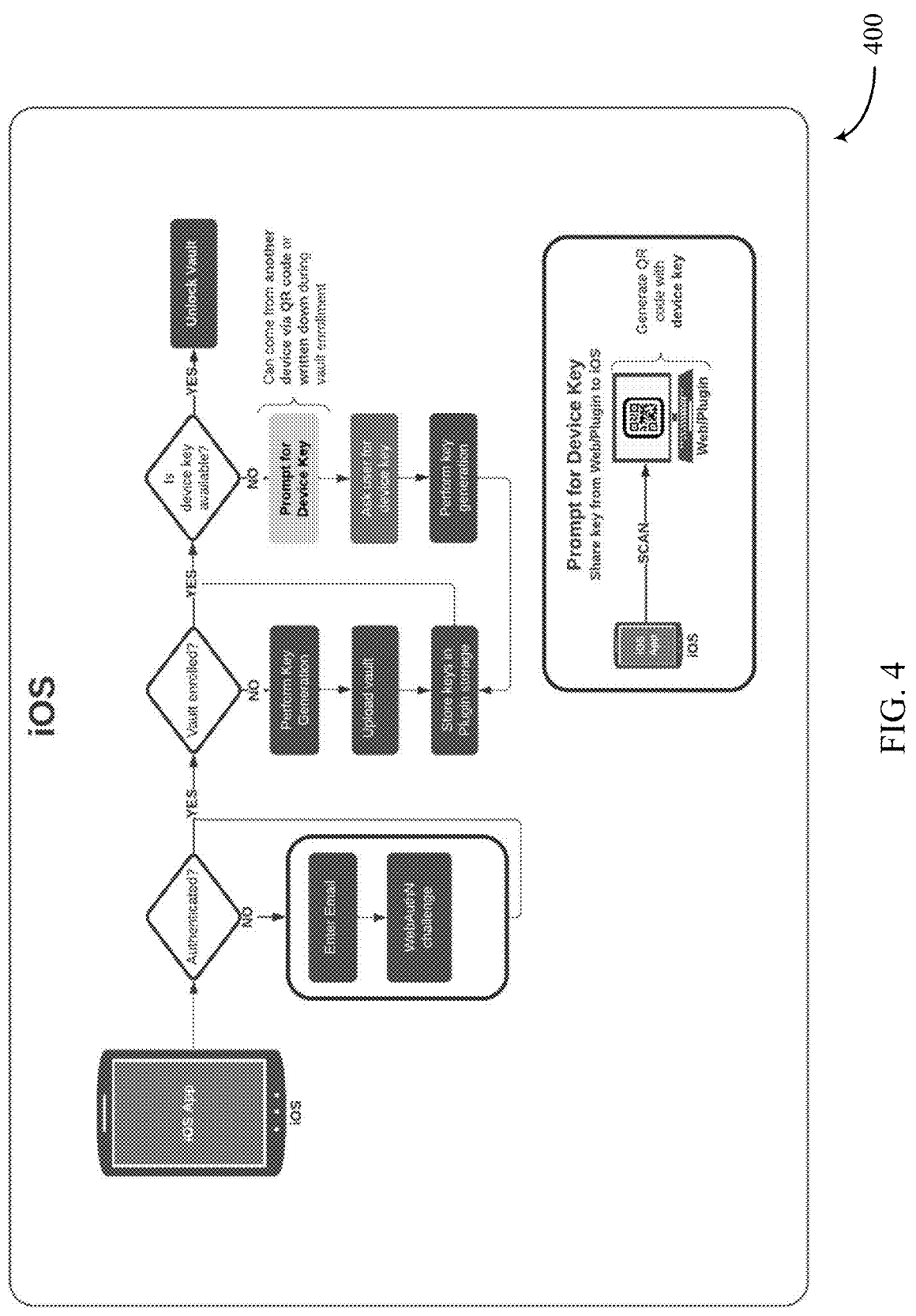

FIG. 4 shows an example of a flowchart 400 that supports passwordless vault access through secure vault enrollment in accordance with aspects of the present disclosure. The flowchart 400 may implement one or more aspects of the computing system 100, as shown and described with reference to FIG. 1. For example, one or more operations of the flowchart 400 may be implemented (at least in part) by the identity management system 120, a first client device 105 (such as a web client or a mobile client), and a second client device 105 (such as a mobile client or a web client), which may be examples of corresponding devices and systems described herein, including with reference to FIG. 1. The flowchart 400 depicted in the example of FIG. 4 shows an example of a passwordless vault access scheme that enables a user 185 of the identity management system 120 to securely access an application 110 of the identity management system 120 without providing a password.

The techniques described herein support device-assisted recovery. Similar to the device-assisted model, clients of the application 110 can utilize a high-entropy, randomly generated Recovery Key (e.g., device key) that is generated and stored on a client device 105. At the time of vault enrollment, a client device 105 with secure storage may perform the following steps: generate a cryptographically random-character random identifier (e.g., an identifier with a quantity of alphanumeric characters within a range from 16 to 24), known as a Recovery Key; combine, via XOR or concatenation, additional attributes (e.g., userID) to create a Recovery Key (e.g., a secret key); derive an symmetric key using the Recovery Key as an input; generate a random asymmetric keypair; and encrypt the private key with the symmetric key derived from the Recovery Key.

The user 185 may not have to remember a password, or passphrase to unlock their vault, as keys are derived from a randomly generated identifier that is bound to the client device 105. Users that intend to access their account on another client device 105 or browser may use a secure transfer scheme to get access to this key. For example, a secure communication channel used in the device-assisted model may provide users with the ability to transfer secrets between client devices 105. This device bootstrapping scheme may function as a recovery-initiated unlock, prompting the user 185 to enter a recovery key/phrase, which is stored by a secure client. Using the device-assisted recovery schemes described herein, it may be difficult to "break" the key encryption, as keys are stored and randomly generated by an HSM of the client device 105.

To support passwordless vault access, the identity management system 120 may leverage one or more of the techniques described herein. For passwordless authentication, email/SMS, biometrics, or both can be enabled for all users of the application 110. Additionally, or alternatively, the identity management system 120 can leverage passkeys, proof-of-private possession, push notifications or OTPs generated via authenticator applications 110, etc. To support passwordless vault access, the identity management system 120 may employ a device-assisted model, which provides users 185 with improved security by using one or more "trusted" devices to assist with unlocking the vault (and potentially authentication). In some implementations, the identity management system 120 may provide passwordless vault access via device-assisted recovery, prompting the user 185 to enter a—character recovery (e.g., a quantity of characters within a range of 16 to 24 characters) or bootstrap key (also referred to herein as a Recovery Key or device key) to unlock their vault when trust has not been established. Additionally, or alternatively, the identity management system 120 may support passwordless vault access via push notifications to unlock the vault from a trusted client. In some other implementations, the identity management system 120 may support passwordless vault access via proof-of-private possession, joining authentication with vault access.

The described techniques may further support email and biometrics with a Recovery Key. Users 185 that register for an account may have a client device 105 and a Recovery Key that is generated and stored for them upon successful authentication. To adequately and securely generate and store this key, the application 110 may assert device posture rules by prompting users to install a native mobile application.

In some implementations, a plug-in (e.g., a browser extension) or native mobile application 110 may function as trusted agents of the identity management system 120. In some examples, multi-device use may involve manual input of the Recovery Key for the first-time use. In other examples, the Recovery Key may be transferred using push notifications, among other examples. An IdP may support passkey enrollment and sign-in as a primary factor. Additionally, users that have enrolled their mobile device as a vault authenticator may be able to access cryptographic keys to decrypt secrets across multiple devices, without needing to manually input their Recovery Key.

In some implementations, push notifications can be used to "unlock" vaults instead of requiring a Recovery Key to be input by the user for users without a browser extension. At any point, users can set up a connection with a native client of the identity management system to securely exchange a Recovery Key. The techniques described herein may further support trusted device authentication and unlock. After a user 185 has registered on a client device 105 with secure storage, they can reuse their existing session and symmetric keys (e.g. vault keys) to bootstrap a secondary device. By extending adaptation of the OAuth 2.0 token exchange protocol, the identity management system may enable a client to establish a web or native session by receiving tokens (access, identity, etc.) from the authenticated client, requesting client-scoped tokens from the authorization server, establishing a browser or native app session using newly granted client tokens. Upon session generation, clients can then securely communicate with one another to establish trust and share vault information. As a result, one previously authenticated device can be used to establish authenticated context with any other device, simplifying login attempts and auto-unlocking the vault for a client application of the identity management system. Users of the application 110 (e.g., client) may be able to utilize a secondary device to login to their account and unlock their vault.

Figure 5:
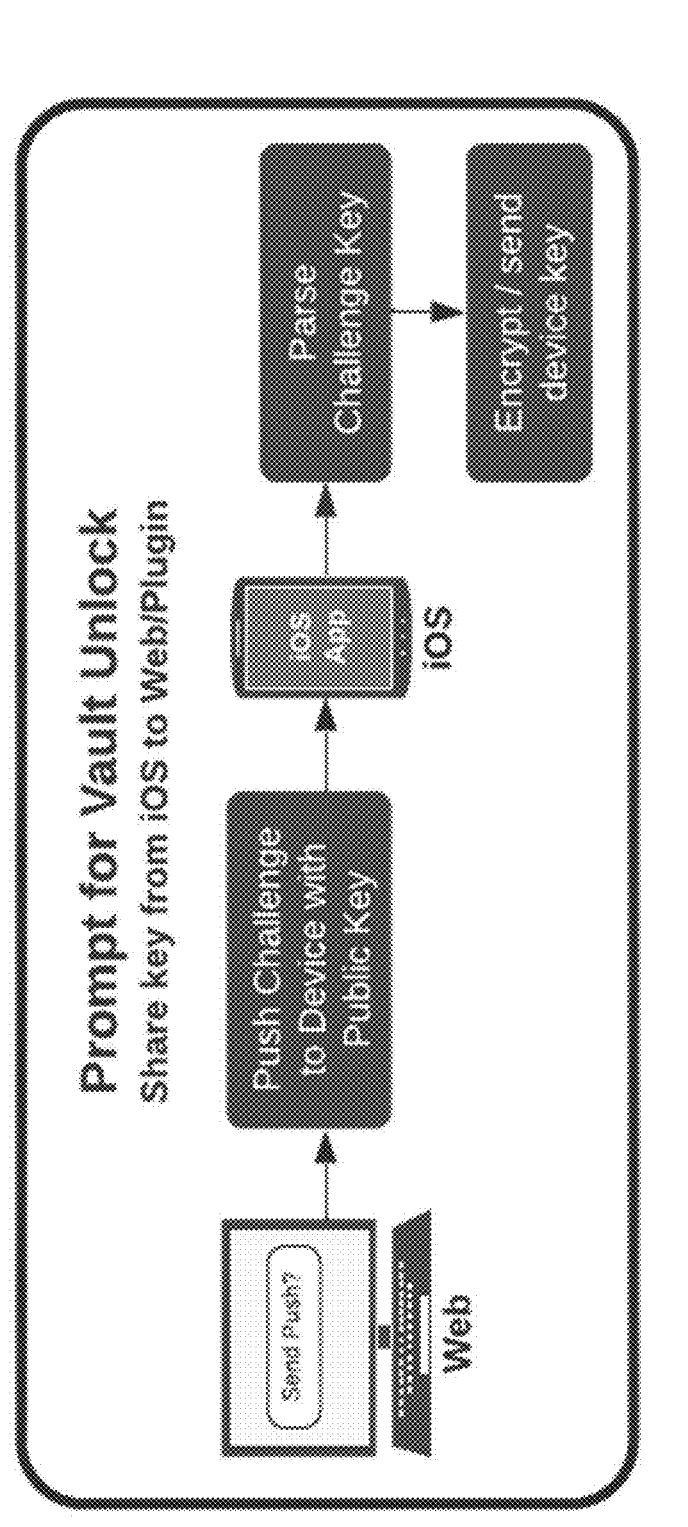

FIG. 5 shows an example of a flowchart 500 that supports passwordless vault access through secure vault enrollment in accordance with aspects of the present disclosure. The flowchart 500 may implement one or more aspects of the computing system 100, as shown and described with reference to FIG. 1. For example, one or more operations of the flowchart 500 may be implemented (at least in part) by the identity management system 120, a first client device 105 (such as a web client or a mobile client), and a second client device 105 (such as a mobile client or a web client), which may be examples of corresponding devices and systems described herein, including with reference to FIG. 1. The flowchart 500 depicted in the example of FIG. 5 shows an example of a passwordless vault access scheme that enables a user 185 of the identity management system 120 to securely access an application 110 of the identity management system 120 without providing a password.

The techniques described herein support device-assisted recovery. Similar to device-assisted models, clients of the application 110 can utilize a high-entropy, randomly generated Recovery Key (e.g., device key) that is generated and stored on a client device 105. At the time of vault enrollment, a client device 105 with secure storage may perform the following steps: generate a cryptographically random-character random identifier (e.g., the characters being within a range of 16 to 24 characters), known as a Recovery Key; combine, via XOR or concatenation, additional attributes (e.g., user ID) to create a Recovery Key (e.g., a secret key); derive an symmetric key using the Recovery Key as an input; generate a random asymmetric keypair; and encrypt the private key with the symmetric key derived from the Recovery Key.

The user 185 may not have to remember a password, PIN, or passphrase to unlock their vault, as keys are derived from a randomly generated identifier that is bound to the client device 105. Users that intend to access their account on another client device 105 or browser may use a secure transfer scheme to get access to this key. For example, a secure communication channel used in the device-assisted model may provide users with the ability to transfer secrets between client devices 105. This device bootstrapping scheme may function as a recovery-initiated unlock, prompting the user 185 to enter a recovery key/phrase, which is stored by a secure client. Using the device-assisted recovery schemes described herein, it may be difficult to "break" the key encryption, as keys are stored and randomly generated by an HSM of the client device 105.

To support passwordless vault access, the identity management system 120 may leverage one or more of the techniques described herein. For passwordless authentication, email/SMS and WebAuthn/biometrics can be enabled for all users of the application 110. Additionally, or alternatively, the identity management system 120 can leverage passkeys, proof-of-private possession, push notifications or OTPs generated via authenticator applications 110, etc. To support passwordless vault access, the identity management system 120 may employ a device-assisted model, which provides users 185 with improved security by using one or more "trusted" devices to assist with unlocking the vault (and potentially authentication). In some implementations, the identity management system 120 may provide passwordless vault access via device-assisted recovery, prompting the user 185 to enter a—character (e.g., 16 to 24 character) recovery or bootstrap key (also referred to herein as a Recovery Key) to unlock their vault when trust has not been established. Additionally, or alternatively, the identity management system 120 may support passwordless vault access via push notifications and/or near-field communication (NFC), such as Bluetooth, to unlock the vault from a trusted client. In some other implementations, the identity management system 120 may support passwordless vault access via proof-of-private possession, joining authentication with vault access.

The described techniques may further support email and biometrics with a Recovery Key. Users 185 that register for an account may have a client device 105 and a Recovery Key that is generated and stored for them upon successful authentication. To adequately and securely generate and store this key, the application 110 may assert device posture rules by prompting users to install either a browser extension (e.g., a plug-in) or native mobile application. Doing so may enable the identity management system 120 to replace low-entropy PINs with randomly generated Recovery Keys. As a result, the identity management system 120 can support more users 185.

In some implementations, the browser extension and/or native mobile applications 110 may function as trusted agents of the identity management system 120. In other implementations, the browser extension may be unavailable to store cryptographic keys. In some examples, multi-device use may involve manual input of the Recovery Key for the first-time use. In other examples, the Recovery Key may be transferred or provided using QR codes or push notifications, among other examples. An IdP may support passkey enrollment and sign-in as a primary factor. Once supported, email and WebAuthn as a secondary factor can be replaced with devices that support Passkeys. Additionally, users that have enrolled their mobile device as a vault authenticator may be able to access cryptographic keys to decrypt secrets across multiple devices, without needing to manually input their Recovery Key.

In some implementations, push notifications can be used to "unlock" vaults instead of requiring a Recovery Key to be input by the user for users without a browser extension. At any point, users can set up a connection with a native client of the identity management system to securely exchange a Recovery Key. The techniques described herein may further support trusted device authentication and unlock. After a user 185 has registered on a client device 105 with secure storage, they can reuse their existing session and symmetric keys (e.g., vault keys) to bootstrap a secondary device. By extending adaptation of the OAuth 2.0 token exchange protocol, the identity management system may enable a client to establish a web or native session by receiving tokens (access, identity, etc.) from the authenticated client, requesting client-scoped tokens from the authorization server, establishing a browser or native app session using newly granted client tokens. Upon session generation, clients can then securely communicate with one another to establish trust and share vault information. As a result, one previously authenticated device can be used to establish authenticated context with any other device, simplifying login attempts and auto-unlocking the vault for a client application of the identity management system. Users of the application 110 may be able to utilize a secondary device to login to their account and unlock their vault.

Figure 6:
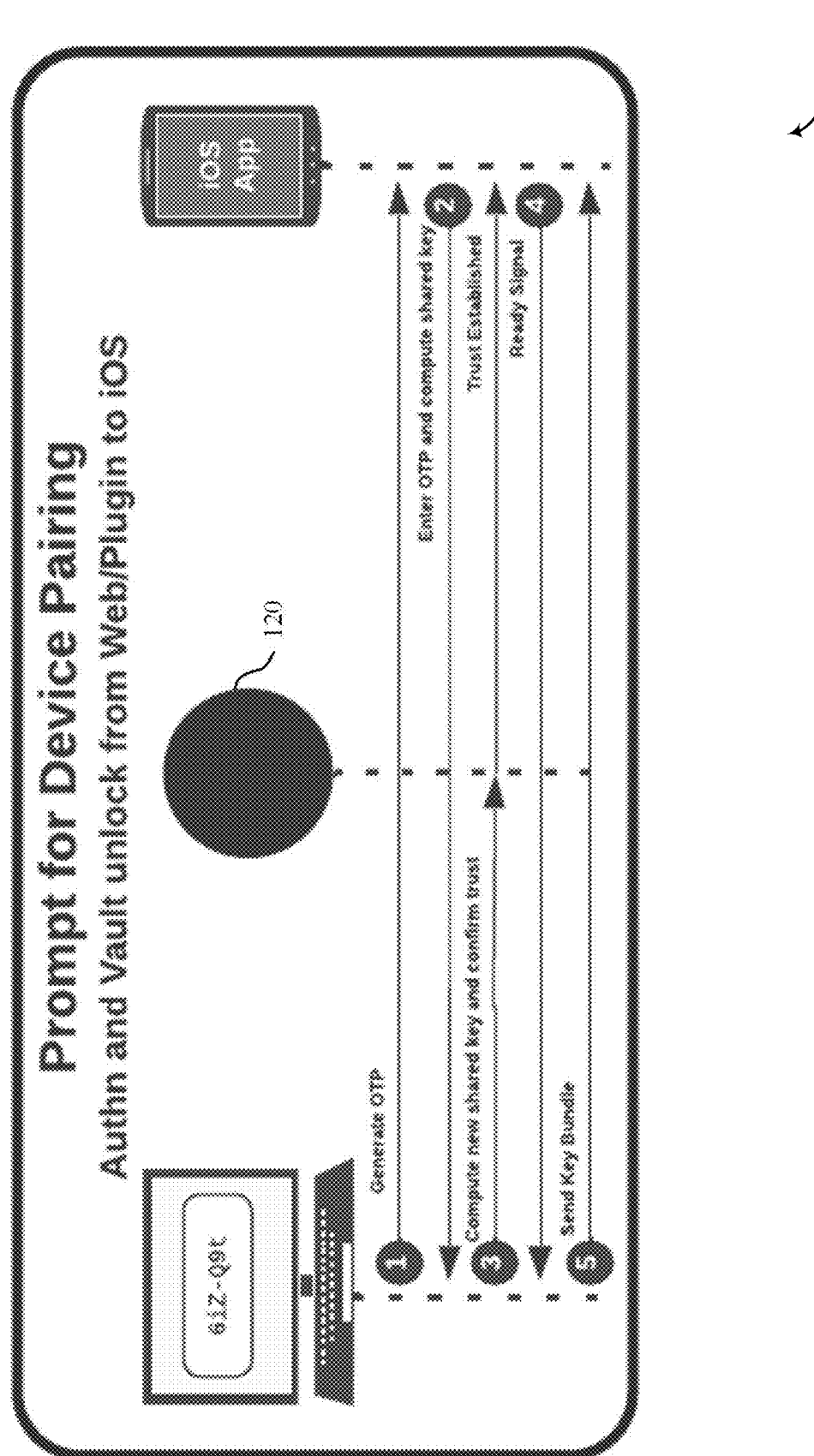

FIG. 6 shows an example of a flowchart 600 that supports passwordless vault access through secure vault enrollment in accordance with aspects of the present disclosure. The flowchart 600 may implement one or more aspects of the computing system 100, as shown and described with reference to FIG. 1. For example, one or more operations of the flowchart 600 may be implemented (at least in part) by the identity management system 120, a first client device 105 (such as a web client or a mobile client), and a second client device 105 (such as a mobile client or a web client), which may be examples of corresponding devices and systems described herein, including with reference to FIG. 1. The flowchart 600 depicted in the example of FIG. 6 shows an example of a passwordless vault access scheme that enables a user 185 of the identity management system 120 to securely access an application 110 of the identity management system 120 without providing a password.

Key Splitting (also referred to as Shamir's secret sharing), is the process of separating a known secret into a finite (k>1) number of individual "shards", each stored in a separate location. On its own, a single shard cannot be used to reconstruct a secret, but when combined with one or more additional shards, a secret can be mathematically computed using polynomial formulas. Table 1 illustrates an example of a key splitting scheme, whereby a secret "a-secret" is split into 5 shards, with a threshold of 3:

TABLE 1

| Key Splitting Scheme | |
| --- | --- |
| Secret | a-secret |
| Hex | 0x612d736563726574 |
| Decimal | 7002379874928321908 |
| Polynomial Function | $f(x) = a_0 + a_1x + a_2x^2 + \ldots + a_{k-1}x^{k-1}$ |
| k (threshold) | k = 2 |
| | $f(x) = ax^2 + bx + c$ |
| Curve Equation | $f(x) = ax^2 + bx + 7002379874928321908$ |
| a (random value) | a = 2 |
| b (random value) | b = 10 |
| c (decimal representation of secret) | $f(x) = 2x^2 + 10x + 7002379874928321908$ |
| Shard Derivation | |
| x = 1 | $f(1) = 2(1)^2 + 10(1) + 7002379874928321908$ |
| | f(1) = 2 + 10 + 7002379874928321908 |
| | f(1) = 7002379874928321920 |
| x = 2 | $f(2) = 2(2)^2 + 10(2) + 7002379874928321908$ |
| | f(2) = 8 + 20 + 7002379874928321908 |
| | f(2) = 7002379874928321936 |
| x = 3 | $f(3) = 2(3)^2 + 10(3) + 7002379874928321908$ |
| | f(3) = 18 + 30 + 7002379874928321908 |
| | f(3) = 7002379874928321956 |
| x = 4 | $f(4) = 2(4)^2 + 10(4) + 7002379874928321908$ |
| | f(4) = 32 + 40 + 7002379874928321908 |
| | f(4) = 7002379874928321980 |
| x = 5 | $f(5) = 2(5)^2 + 10(5) + 7002379874928321908$ |
| | f(5) = 50 + 50 + 7002379874928321908 |
| | f(5) = 7002379874928322008 |
| Known Shards | Shard 1: (1, 7002379874928321920) |
| | Shard 2: (3, 7002379874928321956) |
| | Shard 3: (5, 7002379874928322008) |
| Known Formulas | $f(1) = a(1)^2 + b(1) + c =$ |
| | a + b + c = 7002379874928321920 |
| | $f(3) = a(3)^2 + b(3) + c =$ |
| | 9a + 3b + c = 7002379874928321956 |
| | $f(5) = a(5)^2 + b(5) + c =$ |
| | 25a + 5b + c = 7002379874928322008 |
| Solve System of Equations | Solve for a using f(1) and f(3): |
| | 9(f(1)) = 9a + 9b + 9c = 63021418874354897280 |
| | (9a + 9b + 9c) − (9a + 3b + c) = 63021418874354897280 − 7002379874928321956 |
| | 6b + 8c = 56019038999426575324 |
| | Solve for a using f(1) and f(5): |
| | 25(f(1)) = 25a + 25b + 25c = 175059496873208048000 |
| | (25a + 25b + 25c) − (25a + 5b + c ) = 175059496873208048000 − 7002379874928322008 |
| | 20b + 24c = 168057116998279725992 |
| | Solve for b using the derived functions (common multiple 60): |
| | 60b + 80c = 560190389994265753240 |
| | 60b + 72c = 504171350994839177976 |
| | 8c = 560190389994265753240 − 504171350994839177976 |
| | c = 7002379874928321908 |
| | hex(c) = 0x612d736563726574 |
| | String(hex(c)) = a-secret |

Client software can utilize Shamir's secret sharing to split private keys into multiple segments, rejoining them to unlock the contents of a user's vault. The client of the identity management system can dynamically configure the required threshold, based on how many devices the user has. As an example, the number of shards can be the maximum between 2 and the floor value of total shards, divided by two. Table 2 shows a number of different key splitting variations.

TABLE 2

Key Splitting Schemes

| Devices | Shards | Threshold | Storage Locations |
|---|---|---|---|
| 1 | 2 | 2 | Shard 1: Database |
| | | | Shard 2: Same-device browser, plugin, or app storage |
| 2 | 3 | 2 | Shard 1: Database |
| | | | Shard 2: Device browser, plugin, or app storage |
| | | | Shard 3: Secondary device browser, plugin, or app storage |
| 3 | 4 | 2 | Shard 1: Database |
| | | | Shard 2: Device browser, plugin, or app storage |
| | | | Shard 3: Secondary device browser, plugin, or app storage |
| | | | Shard 4: Third device browser, plugin, or app storage |
| 4 | 5 | 2 | Shard 1: Database |
| | | | Shard 2: Device browser, plugin, or app storage |
| | | | Shard 3: Secondary device browser, plugin, or app storage |
| | | | Shard 4: Third device browser, plugin, or app storage |
| | | | Shard 5: . . . |
| 5 | 6 | 3 | Shard 1: Database |
| | | | Shard 2: Device browser, plugin, or app storage |
| | | | Shard 3: Secondary device browser, plugin, or app storage |
| | | | Shard 4: . . . |
| | | | Shard 5: . . . |
| n | n + 1 | max(2, floor(n + 1/2)) | |

Some benefits of Key Splitting (or Shamir's secret sharing) include: relatively easy bootstrapping between devices; and little to no user-interaction needed to migrate off of PIN. Since users do not have to remember a PIN, they cannot "forget" their PIN, thereby simplifying the recovery process.

Figure 7:
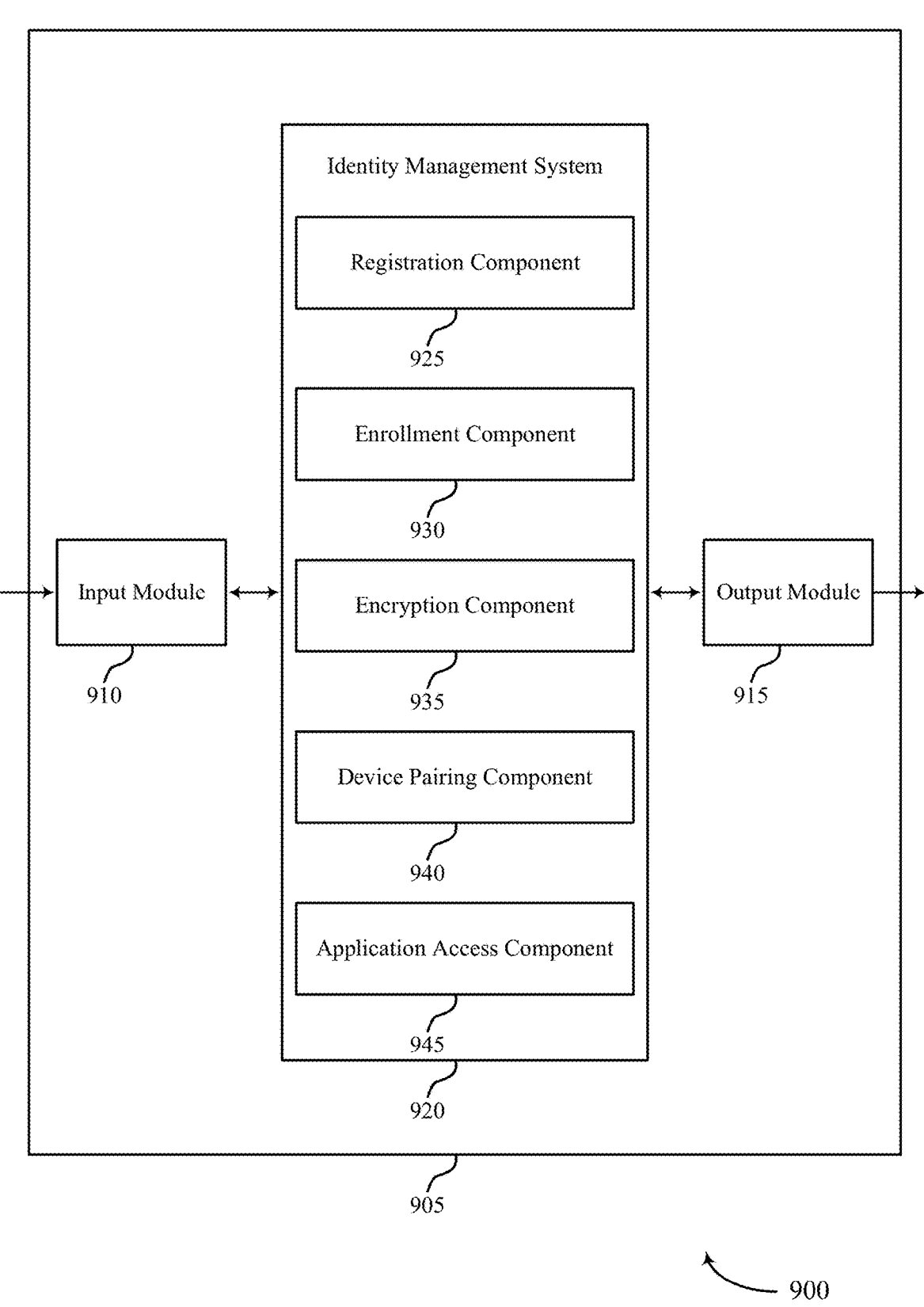
FIG. 7 shows a block diagram of an apparatus that supports passwordless vault access through secure vault enrollment in accordance with aspects of the present disclosure.

FIG. 7 shows a block diagram 900 of a device 905 that supports passwordless vault access through secure vault enrollment in accordance with aspects of the present disclosure. The device 905 may include an input module 910, an output module 915, and an identity management system 920. The device 905, or one of more components of the device 905 (e.g., the input module 910, the output module 915, and the identity management system 920), may include at least one processor, which may be coupled with at least one memory, to support the described techniques. Each of these components may be in communication with one another (e.g., via one or more buses).

The input module 910 may manage input signals for the device 905. For example, the input module 910 may identify input signals based on an interaction with a modem, a keyboard, a mouse, a touchscreen, or a similar device. These input signals may be associated with user input or processing at other components or devices. In some cases, the input module 910 may utilize an operating system such as iOS®, ANDROID®, MS-DOS®, MS-WINDOWS®, OS/2®, UNIX®, LINUX®, or another known operating system to handle input signals. The input module 910 may send aspects of these input signals to other components of the device 905 for processing. For example, the input module 910 may transmit input signals to the identity management system 920 to support passwordless vault access through secure vault enrollment. In some cases, the input module 910 may be a component of an input/output (I/O) controller 1110, as described with reference to FIG. 9.

The output module 915 may be configured to manage output signals for the device 905. For example, the output module 915 may receive signals from other components of the device 905, such as the identity management system 920, and may transmit these signals to other components or devices. In some examples, the output module 915 may transmit output signals for display in a user interface, for storage in a database or data store, for further processing at a server or server cluster, or for any other processes at any number of devices or systems. In some cases, the output module 915 may be a component of an I/O controller 1110, as described with reference to FIG. 9.

For example, the identity management system 920 may include a registration component 925, an enrollment component 930, an encryption component 935, a device pairing component 940, an application access component 945, or any combination thereof. In some examples, the identity management system 920, or various components thereof, may be configured to perform various operations (e.g., receiving, monitoring, transmitting) using or otherwise in cooperation with the input module 910, the output module 915, or both. For example, the identity management system 920 may receive information from the input module 910, send information to the output module 915, or be integrated in combination with the input module 910, the output module 915, or both to receive information, transmit information, or perform various other operations as described herein.

The registration component 925 may be configured to support performing a sign-in or registration process to register a user with an application of an identity management system, where the sign-in or registration process includes receiving an indication of at least one credential associated with an identity of the user. The enrollment component 930 may be configured to support performing a vault enrollment process to configure a secure vault for the user of the application, where the vault enrollment process includes. The enrollment component 930 may be configured to support generating a cryptographically random identifier (e.g., an identifier that includes a device key or Recovery Key). The enrollment component 930 may be configured to support combining the cryptographically random identifier with one or more attributes of the user to generate a Recovery Key. The enrollment component 930 may be configured to support using a client-side encryption function to derive a symmetric key from the Recovery Key. The enrollment component 930 may be configured to support generating a cryptographically random asymmetric keypair that includes a private key and a public key. The encryption component 935 may be configured to support encrypting the private key of the cryptographically random asymmetric keypair with the symmetric key derived from the Recovery Key. The enrollment component 930 may be configured to support storing one or more of the Recovery Key, the symmetric key, the private key, and the public key on a first client device of the user. The enrollment component 930 may be configured to support uploading, to the identity management system, data associated with the secure vault configured for the user of the application. The device pairing component 940 may be configured to support performing a device pairing operation to transfer the Recovery Key from the first client device to a second client device of the user, where the second client device is operable to use the Recovery Key to generate the symmetric key, the private key, the public key, or a combination thereof. The application access component 945 may be configured to support using one or more of the symmetric key, the private key, or the public key to access the application of the identity management system via the second client device of the user.

Figure 8:
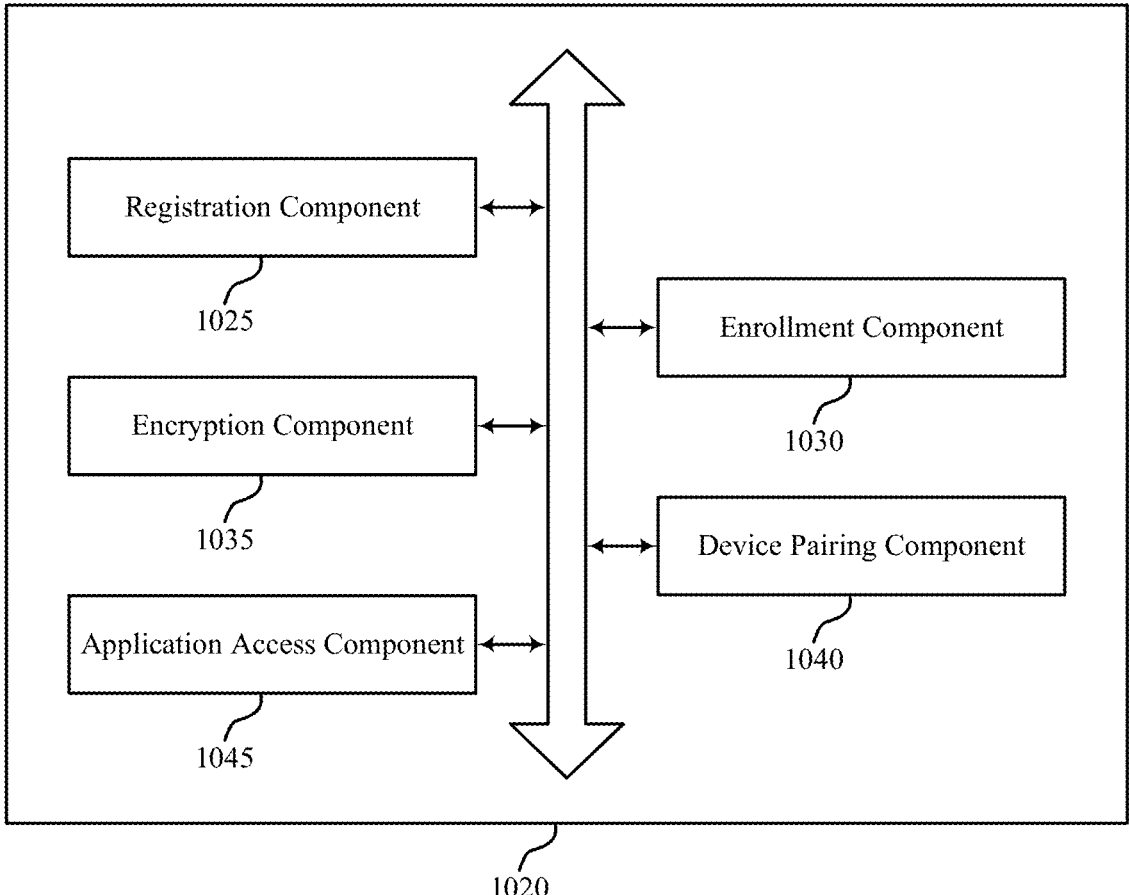
FIG. 8 shows a block diagram of an identity management system that supports passwordless vault access through secure vault enrollment in accordance with aspects of the present disclosure.

FIG. 8 shows a block diagram 1000 of an identity management system 1020 that supports passwordless vault access through secure vault enrollment in accordance with aspects of the present disclosure. The identity management system 1020 may be an example of aspects of an identity management system 120, as described herein. The identity management system 1020, or various components thereof, may be an example of means for performing various aspects of passwordless vault access through secure vault enrollment, as described herein. For example, the identity management system 1020 may include a registration component 1025, an enrollment component 1030, an encryption component 1035, a device pairing component 1040, an application access component 1045, or any combination thereof. Each of these components, or components of subcomponents thereof (e.g., one or more processors, one or more memories), may communicate, directly or indirectly, with one another (e.g., via one or more buses).

The registration component 1025 may be configured to support performing a sign-in or registration process to register a user with an application of an identity management system, where the sign-in or registration process includes receiving an indication of at least one credential associated with an identity of the user. The enrollment component 1030 may be configured to support performing a vault enrollment process to configure a secure vault for the user of the application, where the vault enrollment process includes. In some examples, the enrollment component 1030 may be configured to support generating a cryptographically random identifier. In some examples, the enrollment component 1030 may be configured to support combining the Recovery Key with one or more attributes of the user to generate a Recovery Key (e.g., a secret key). In some examples, the enrollment component 1030 may be configured to support using a client-side encryption function to derive a symmetric key from the Recovery Key. In some examples, the enrollment component 1030 may be configured to support generating a cryptographically random asymmetric keypair that includes a private key and a public key. The encryption component 1035 may be configured to support encrypting the private key of the cryptographically random asymmetric keypair with the symmetric key derived from the Recovery Key. In some examples, the enrollment component 1030 may be configured to support storing one or more of the Recovery Key, the vault key (e.g., the secret key), the symmetric key, the private key, and the public key on a first client device of the user. In some examples, the enrollment component 1030 may be configured to support uploading, to the identity management system, data associated with the secure vault configured for the user of the application. The device pairing component 1040 may be configured to support performing a device pairing operation to transfer the Recovery Key from the first client device to a second client device of the user, where the second client device is operable to use the Recovery Key to generate the symmetric key, the private key, the public key, or a combination thereof. The application access component 1045 may be configured to support using one or more of the symmetric key, the private key, or the public key to access the application of the identity management system via the second client device of the user.

In some examples, the sign-in or registration process may include receiving, via the first client device or the second client device, a user input including the at least one credential of the user and an OTP provided by the identity management system.

In some examples, the OTP includes a 6-digit email verification code. In some examples, the first client device includes a mobile client and the second client device includes a web client. In some examples, the first client device includes a web client and the second client device includes a mobile client.

In some examples, the enrollment component 1030 may be configured to support installing the application or a plug-in (e.g., a browser extension) associated with the application on the first client device or the second client device, where at least one step of the vault enrollment process is performed using the application or the browser extension.

In some examples, the Recovery Key is transferred from the first client device to the second client device via a user input, or a secure communication link between the first client device and the second client device.

Figure 9:
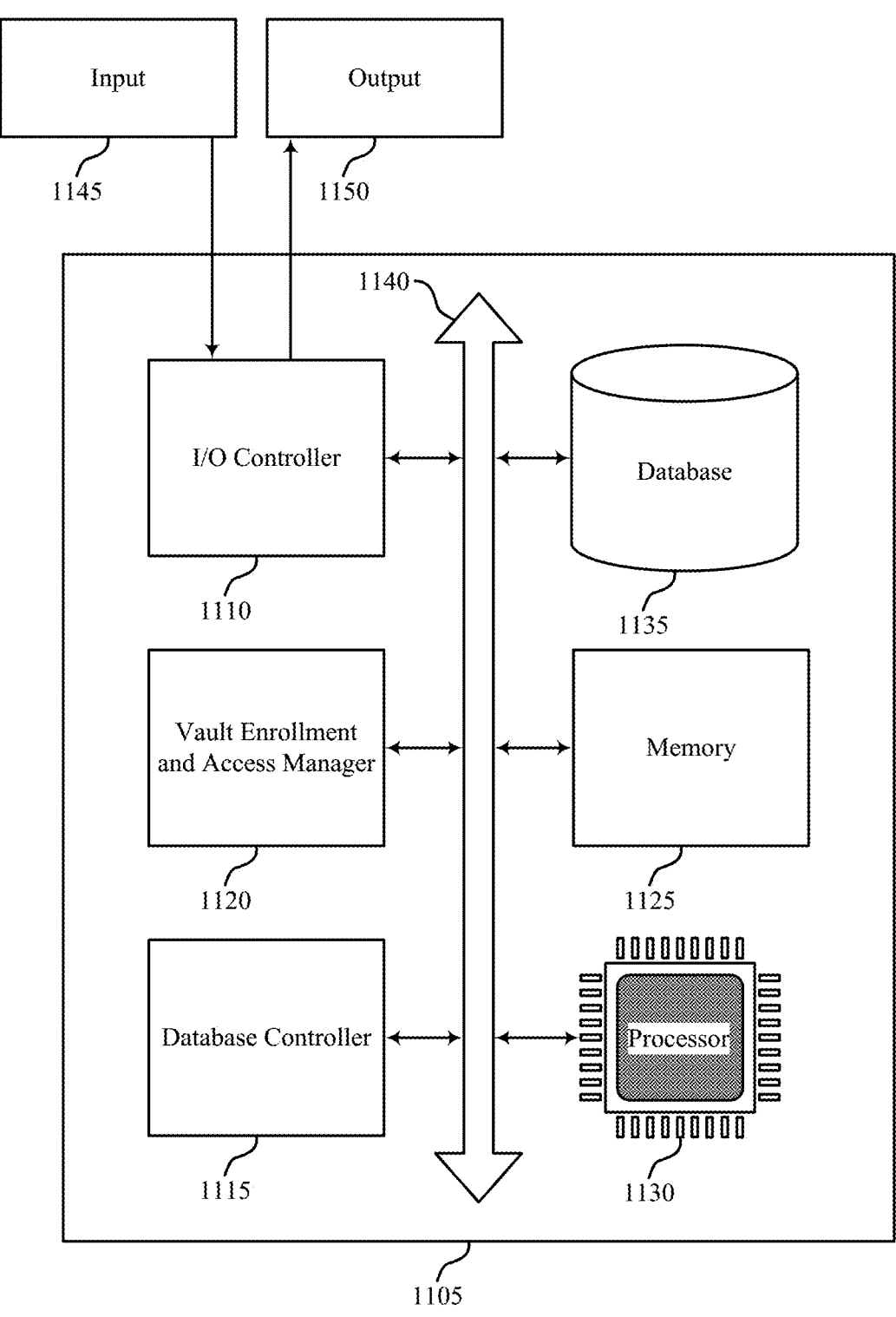
FIG. 9 shows a diagram of a system including a device that supports passwordless vault access through secure vault enrollment in accordance with aspects of the present disclosure.

FIG. 9 shows a diagram of a system 1100 including a device 1105 that supports passwordless vault access through secure vault enrollment in accordance with aspects of the present disclosure. The device 1105 may be an example of or include the components of a device 905 as described herein. The device 1105 may include components for bi-directional voice and data communications including components for transmitting and receiving communications, such as a vault enrollment and access manager 1120, an I/O controller 1110, a database controller 1115, at least one memory 1125, at least one processor 1130, and a database 1135. These components may be in electronic communication or otherwise coupled (e.g., operatively, communicatively, functionally, electronically, electrically) via one or more buses (e.g., a bus 1140).

The I/O controller 1110 may manage input signals 1145 and output signals 1150 for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. In other cases, the I/O controller 1110 may represent or interact with a modem, a keyboard, a mouse, a touchscreen, or a similar device. In some cases, the I/O controller 1110 may be implemented as part of a processor 1130. In some examples, a user may interact with the device 1105 via the I/O controller 1110 or via hardware components controlled by the I/O controller 1110.

The database controller 1115 may manage data storage and processing in a database 1135. In some cases, a user may interact with the database controller 1115. In other cases, the database controller 1115 may operate automatically without user interaction. The database 1135 may be an example of a single database, a distributed database, multiple distributed databases, a data store, a data lake, or an emergency backup database.

Memory 1125 may include random-access memory (RAM) and read-only memory (ROM). The memory 1125 may store computer-readable, computer-executable software including instructions that, when executed, cause at least one processor 1130 to perform various functions described herein. In some cases, the memory 1125 may contain, among other things, a basic I/O system (BIOS) which may control basic hardware or software operation such as the interaction with peripheral components or devices. The memory 1125 may be an example of a single memory or multiple memories. For example, the device 1105 may include one or more memories 1125.

The processor 1130 may include an intelligent hardware device (e.g., a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some cases, the processor 1130 may be configured to operate a memory array using a memory controller. In other cases, a memory controller may be integrated into the processor 1130. The processor 1130 may be configured to execute computer-readable instructions stored in at least one memory 1125 to perform various functions (e.g., functions or tasks supporting passwordless vault access through secure vault enrollment). The processor 1130 may be an example of a single processor or multiple processors. For example, the device 1105 may include one or more processors 1130.

For example, the vault enrollment and access manager 1120 may be configured to support performing a sign-in or registration process to register a user with an application of an identity management system, where the sign-in or registration process includes receiving an indication of at least one credential associated with an identity of the user. The vault enrollment and access manager 1120 may be configured to support performing a vault enrollment process to configure a secure vault for the user of the application, where the vault enrollment process includes. The vault enrollment and access manager 1120 may be configured to support generating a cryptographically random identifier. The vault enrollment and access manager 1120 may be configured to support combining the cryptographically random identifier with one or more attributes of the user to generate a Recovery Key. The vault enrollment and access manager 1120 may be configured to support using a client-side encryption function to derive a symmetric key from the Recovery Key. The vault enrollment and access manager 1120 may be configured to support generating a cryptographically random asymmetric keypair that includes a private key and a public key. The vault enrollment and access manager 1120 may be configured to support encrypting the private key of the cryptographically random asymmetric keypair with the symmetric key derived from the Recovery Key. The vault enrollment and access manager 1120 may be configured to support storing one or more of the Recovery Key, the vault key, the symmetric key, the private key, and the public key on a first client device of the user. The vault enrollment and access manager 1120 may be configured to support uploading, to the identity management system, data associated with the secure vault configured for the user of the application. The vault enrollment and access manager 1120 may be configured to support performing a device pairing operation to transfer the Recovery Key (e.g., device key) from the first client device to a second client device of the user, where the second client device is operable to use the Recovery Key to generate the symmetric key, the private key, the public key, or a combination thereof. The vault enrollment and access manager 1120 may be configured to support using one or more of the symmetric key, the private key, or the public key to access the application of the identity management system via the second client device of the user.

FIG. 10 shows a flowchart illustrating a method 1200 that supports passwordless vault access through secure vault enrollment in accordance with aspects of the present disclosure. The operations of the method 1200 may be implemented by an identity management system or components thereof. For example, the operations of the method 1200 may be performed by an identity management system 120, as described with reference to FIGS. 1 through 9. In some examples, the identity management system may execute a set of instructions to control the functional elements of the identity management system to perform the described functions. Additionally, or alternatively, the identity management system may perform aspects of the described functions using special-purpose hardware.

At 1205, the method may include performing a sign-in or registration process to register a user with an application of an identity management system, where the sign-in or registration process includes receiving an indication of at least one credential associated with an identity of the user. In some examples, aspects of the operations of 1205 may be performed by a registration component 1025, as described with reference to FIG. 8.

At 1210, the method may include performing a vault enrollment process to configure a secure vault for the user of the application, where the vault enrollment process includes: generating a cryptographically random identifier (e.g., a cryptographically random identifier that includes a device key), combining the cryptographically random identifier with one or more attributes of the user to generate a secret key (e.g., a Recovery Key), using a client-side encryption function to derive a symmetric key from the Recovery Key, generating a cryptographically random asymmetric keypair that includes a private key and a public key, encrypting the private key of the cryptographically random asymmetric keypair with the symmetric key derived from the Recovery Key, storing one or more of the Recovery Key, a vault key, the symmetric key, the private key, and the public key on a first client device of the user, and uploading, to the identity management system, data associated with the secure vault configured for the user of the application. In some examples, aspects of the operations of 1210 may be performed by an enrollment component 1030, as described with reference to FIG. 8.

At 1215, the method may include performing a device pairing operation to transfer the Recovery Key from the first client device to a second client device of the user, where the second client device is operable to use the Recovery Key to generate the symmetric key, the private key, the public key, or a combination thereof. In some examples, aspects of the operations of 12515 may be performed by a device pairing component 1040, as described with reference to FIG. 8.

At 1220, the method may include using one or more of the symmetric key, the private key, or the public key to access the application of the identity management system via the second client device of the user. In some examples, aspects of the operations of 1220 may be performed by an application access component 1045, as described with reference to FIG. 8.

The following provides an overview of aspects of the present disclosure:

Aspect 1: A method, comprising: performing a sign-in or registration process to register a user with an application of an identity management system, wherein the sign-in or registration process comprises receiving an indication of at least one credential associated with an identity of the user; performing a vault enrollment process to configure a secure vault for the user of the application, wherein the vault enrollment process comprises: generating a cryptographically random identifier that comprises a device key; combining the cryptographically random identifier with one or more attributes of the user to generate a secret key (e.g., a Recovery Key); using a client-side encryption function to derive a symmetric key from the Recovery Key; generating a cryptographically random asymmetric keypair that includes a private key and a public key; encrypting the private key of the cryptographically random asymmetric keypair with the symmetric key derived from the Recovery Key; storing one or more of the Recovery Key (e.g., the device key, the secret key, or both), a vault key, the symmetric key, the private key, and the public key on a first client device of the user; and uploading, to the identity management system, data associated with the secure vault configured for the user of the application; performing a device pairing operation to transfer the Recovery Key from the first client device to a second client device of the user, wherein the second client device is operable to use the Recovery Key to generate the symmetric key, the private key, the public key, or a combination thereof; and using one or more of the symmetric key, the private key, or the public key to access the application of the identity management system via the second client device of the user.

Aspect 2: The method of aspect 1, wherein the sign-in or registration process comprises: receiving, via the first client device or the second client device, a user input comprising the at least one credential of the user and an OTP provided by the identity management system.

Aspect 3: The method of aspect 2, wherein the OTP comprises a 6-digit email verification code.

Aspect 4: The method of any of aspects 1 through 3, wherein the first client device comprises a mobile client and the second client device comprises a web client.

Aspect 5: The method of any of aspects 1 through 4, wherein the first client device comprises a web client and the second client device comprises a mobile client.

Aspect 6: The method of any of aspects 1 through 5, further comprising: installing the application or a plug-in or a browser extension associated with the application on the first client device or the second client device, wherein at least one step of the vault enrollment process is performed using the application or the browser extension.

Aspect 7: The method of any of aspects 1 through 6, wherein the Recovery Key is transferred from the first client device to the second client device via user input, or a secure communication link between the first client device and the second client device.

Aspect 8: An apparatus comprising: one or more memories storing processor-executable code; and one or more processors coupled with the one or more memories, wherein the one or more processors are individually or collectively operable to execute the code to cause the apparatus to perform a method of any of aspects 1 through 7.

Aspect 9: An apparatus comprising at least one means for performing a method of any of aspects 1 through 7.

Aspect 10: A non-transitory computer-readable medium storing code that comprises instructions executable by at least one processor to perform a method of any of aspects 1 through 7.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations, and does not represent all the examples that may be implemented, or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by one or more processors, firmware, or any combination thereof. If implemented in software executed by one or more processors, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:

performing a sign-in or registration process to register a user with an application of an identity management system, wherein the sign-in or registration process comprises receiving an indication of at least one credential associated with an identity of the user;

performing a vault enrollment process to configure a secure vault for the user of the application, wherein the vault enrollment process comprises:

generating a cryptographically random identifier;

combining the cryptographically random identifier with one or more attributes of the user to generate a Recovery Key;

using a client-side encryption function to derive a symmetric key from the Recovery Key;

generating a cryptographically random asymmetric keypair that includes a private key and a public key;

encrypting the private key of the cryptographically random asymmetric keypair with the symmetric key derived from the Recovery Key;

storing one or more of the Recovery Key, a vault key, the symmetric key, the private key, and the public key on a first client device of the user; and uploading, to the identity management system, data associated with the secure vault configured for the user of the application;

performing a device pairing operation to transfer the Recovery Key from the first client device to a second client device of the user, wherein the second client device is operable to use the Recovery Key to generate the symmetric key, the private key, the public key, or a combination thereof; and using one or more of the symmetric key, the private key, or the public key to access the application of the identity management system via the second client device of the user.

2. The method of claim 1, wherein the sign-in or registration process comprises:

receiving, via the first client device or the second client device, a user input comprising the at least one credential of the user and a one-time password (OTP) provided by the identity management system.

3. The method of claim 2, wherein the OTP comprises a 6-digit email verification code.

4. The method of claim 1, wherein the first client device comprises a mobile client and the second client device comprises a web client.

5. The method of claim 1, wherein the first client device comprises a web client and the second client device comprises a mobile client.

6. The method of claim 1, further comprising:

installing the application or a browser extension associated with the application on the first client device or the second client device, wherein at least one step of the vault enrollment process is performed using the application or the browser extension.

7. The method of claim 1, wherein the Recovery Key is transferred from the first client device to the second client device via a quick response (QR) code, a user input, or a secure communication link between the first client device and the second client device.

8. An apparatus, comprising:

one or more memories storing processor-executable code; and one or more processors coupled with the one or more memories and individually or collectively operable to execute the code to cause the apparatus to:

perform a sign-in or registration process to register a user with an application of an identity management system, wherein the sign-in or registration process comprises receiving an indication of at least one credential associated with an identity of the user;

perform a vault enrollment process to configure a secure vault for the user of the application, wherein the vault enrollment process comprises:

generating a cryptographically random identifier;

combining the cryptographically random identifier with one or more attributes of the user to generate a Recovery Key;

using a client-side encryption function to derive a symmetric key from the Recovery Key;

generating a cryptographically random asymmetric keypair that includes a private key and a public key;

encrypting the private key of the cryptographically random asymmetric keypair with the symmetric key derived from the Recovery Key;

storing one or more of the Recovery Key, a vault key, the symmetric key, the private key, and the public key on a first client device of the user; and uploading, to the identity management system, data associated with the secure vault configured for the user of the application;

perform a device pairing operation to transfer the Recovery Key from the first client device to a second client device of the user, wherein the second client device is operable to use the Recovery Key to generate the symmetric key, the private key, the public key, or a combination thereof; and use one or more of the symmetric key, the private key, or the public key to access the application of the identity management system via the second client device of the user.

9. The apparatus of claim 8, wherein the sign-in or registration process comprises:

receiving, via the first client device or the second client device, a user input comprising the at least one credential of the user and a one-time password (OTP) provided by the identity management system.

10. The apparatus of claim 9, wherein the OTP comprises a 6-digit email verification code.

11. The apparatus of claim 8, wherein the first client device comprises a mobile client and the second client device comprises a web client.

12. The apparatus of claim 8, wherein the first client device comprises a web client and the second client device comprises a mobile client.

13. The apparatus of claim 8, wherein the one or more processors are individually or collectively further operable to execute the code to cause the apparatus to:

install the application or a browser extension associated with the application on the first client device or the second client device, wherein at least one step of the vault enrollment process is performed using the application or the browser extension.

14. The apparatus of claim 8, wherein the Recovery Key is transferred from the first client device to the second client device via a quick response (QR) code, a user input, or a secure communication link between the first client device and the second client device.

15. A non-transitory computer-readable medium storing code that comprises instructions executable by one or more processors to:

perform a sign-in or registration process to register a user with an application of an identity management system, wherein the sign-in or registration process comprises receiving an indication of at least one credential associated with an identity of the user;

perform a vault enrollment process to configure a secure vault for the user of the application, wherein the vault enrollment process comprises:

generating a cryptographically random identifier;

combining the cryptographically random identifier with one or more attributes of the user to generate a Recovery Key;

using a client-side encryption function to derive a symmetric key from the Recovery Key;

generating a cryptographically random asymmetric keypair that includes a private key and a public key;

encrypting the private key of the cryptographically random asymmetric keypair with the symmetric key derived from the Recovery Key;

storing one or more of the Recovery Key, a vault key, the symmetric key, the private key, and the public key on a first client device of the user; and uploading, to the identity management system, data associated with the secure vault configured for the user of the application;

perform a device pairing operation to transfer the Recovery Key from the first client device to a second client device of the user, wherein the second client device is operable to use the Recovery Key to generate the symmetric key, the private key, the public key, or a combination thereof; and use one or more of the Recovery Key, the symmetric key, the private key, or the public key to access the application of the identity management system via the second client device of the user.

16. The non-transitory computer-readable medium of claim 15, wherein the instructions to sign-in or registration process are executable by the one or more processors to:

receive, via the first client device or the second client device, a user input comprising the at least one credential of the user and a one-time password (OTP) provided by the identity management system.

17. The non-transitory computer-readable medium of claim 16, wherein the OTP comprises a 6-digit email verification code.

18. The non-transitory computer-readable medium of claim 15, wherein the first client device comprises a mobile client and the second client device comprises a web client.

19. The non-transitory computer-readable medium of claim 15, wherein the first client device comprises a web client and the second client device comprises a mobile client.

20. The non-transitory computer-readable medium of claim 15, wherein the instructions are further executable by the one or more processors to:

install the application or a browser extension associated with the application on the first client device or the second client device, wherein at least one step of the vault enrollment process is performed using the application or the browser extension.

\* \* \* \* \*